US007469386B2

(12) United States Patent
Bear et al.

(10) Patent No.: US 7,469,386 B2
(45) Date of Patent: Dec. 23, 2008

(54) SYSTEMS AND METHODS FOR INTERFACING WITH COMPUTER DEVICES

(75) Inventors: Eric Justin Gould Bear, Bellevue, WA (US); William Hong Vong, Seattle, WA (US); Leroy Bertrand Keely, Portola Valley, CA (US); Barbee Eve Teasley, Leavenworth, WA (US); Adam John Richardson, Oakland, CA (US); Michael H. Tsang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 600 days.

(21) Appl. No.: 10/768,777

(22) Filed: Jan. 30, 2004

(65) Prior Publication Data

US 2004/0227731 A1    Nov. 18, 2004

Related U.S. Application Data

(63) Continuation of application No. 10/430,996, filed on May 5, 2003, now abandoned.

(60) Provisional application No. 60/433,914, filed on Dec. 16, 2002.

(51) Int. Cl.
    *G06F 3/048* (2006.01)
(52) U.S. Cl. ...................... 715/771; 715/840
(58) Field of Classification Search ................. 715/771
    See application file for complete search history.

(56) References Cited

U.S. PATENT DOCUMENTS

| 4,656,654 | A | * | 4/1987 | Dumas ................... 379/93.21 |
|---|---|---|---|---|
| 5,237,654 | A | * | 8/1993 | Shackelford et al. ........ 715/804 |
| 5,598,522 | A | * | 1/1997 | Inatomi ................... 715/821 |
| 5,659,694 | A | * | 8/1997 | Bibayan ................... 715/788 |
| 5,737,557 | A | * | 4/1998 | Sullivan .................. 715/765 |
| 5,807,175 | A | * | 9/1998 | Davis et al. ............... 463/36 |
| 6,198,473 | B1 | | 3/2001 | Armstrong ................ 345/163 |
| 6,347,997 | B1 | | 2/2002 | Armstrong ................ 463/37 |
| 6,496,181 | B1 | | 12/2002 | Bömer et al. ............. 345/167 |
| 6,559,831 | B1 | | 5/2003 | Armstrong ................ 345/159 |

(Continued)

OTHER PUBLICATIONS

Judith Stern and Robert Lattieri□□Quicktime 5 for Macintosh and Windows: Visual Quickstart Guide□□Peachpit Press □□Jun. 27, 2001□□Screen Print.*

(Continued)

*Primary Examiner*—Rachna S Desai
*Assistant Examiner*—Andrea N Long
(74) *Attorney, Agent, or Firm*—Woodcock Washburn LLP

(57) ABSTRACT

The present invention provides a systems, methods, and products for enhanced user navigation to compliment (but not necessarily replace) a computer keyboard and mouse by providing a robust navigation interface. The present invention may comprise: a minimally necessary group of commands; combining the functionality a set of at least two command calls into a single logical button; for a single button, prioritizing a set of command calls from first to last and then calling each until one is accepted; logically remapping commands to buttons for a navigational device coupled to a physically rotate-able display device; and mapping a substitute command to a logical button for when the button is engaged in a predetermined manner other than the primary manner in which the logical button is engaged (e.g., double-clicking, flicking, press-and-hold, etc.) so that a substitute command can in fact be issued, among others.

3 Claims, 27 Drawing Sheets

U.S. PATENT DOCUMENTS

| | | | |
|---|---|---|---|
| 6,686,931 B1 | 2/2004 | Bodnar | |
| 6,762,773 B2 | 7/2004 | Kolde et al. | |
| 6,917,373 B2 | 7/2005 | Vong et al. | |
| 7,319,743 B1 | 1/2008 | Dunlap | |
| 2001/0011995 A1* | 8/2001 | Hinckley et al. | 345/156 |
| 2001/0015718 A1 | 8/2001 | Hinckley et al. | 345/156 |
| 2002/0054023 A1 | 5/2002 | Adan et al. | 345/163 |
| 2004/0216059 A1 | 10/2004 | Vong et al. | |

OTHER PUBLICATIONS

Logitech Mouse User's Guide☐☐Copyright Logitech 1993☐☐pp. iii, 11, and 13.*

Maryanne Snyder Gregory Lowney and Jeff Witt☐☐Microsoft Windows Keyboard Guide☐☐Copyright 1996☐☐Last modified Jul. 30, 1998.*

Snyder M., et al., "Microsoft Windows 98 Keyboard Guide". *User's Guide*, Jul. 20, 1999, pp. 1-19.

* cited by examiner

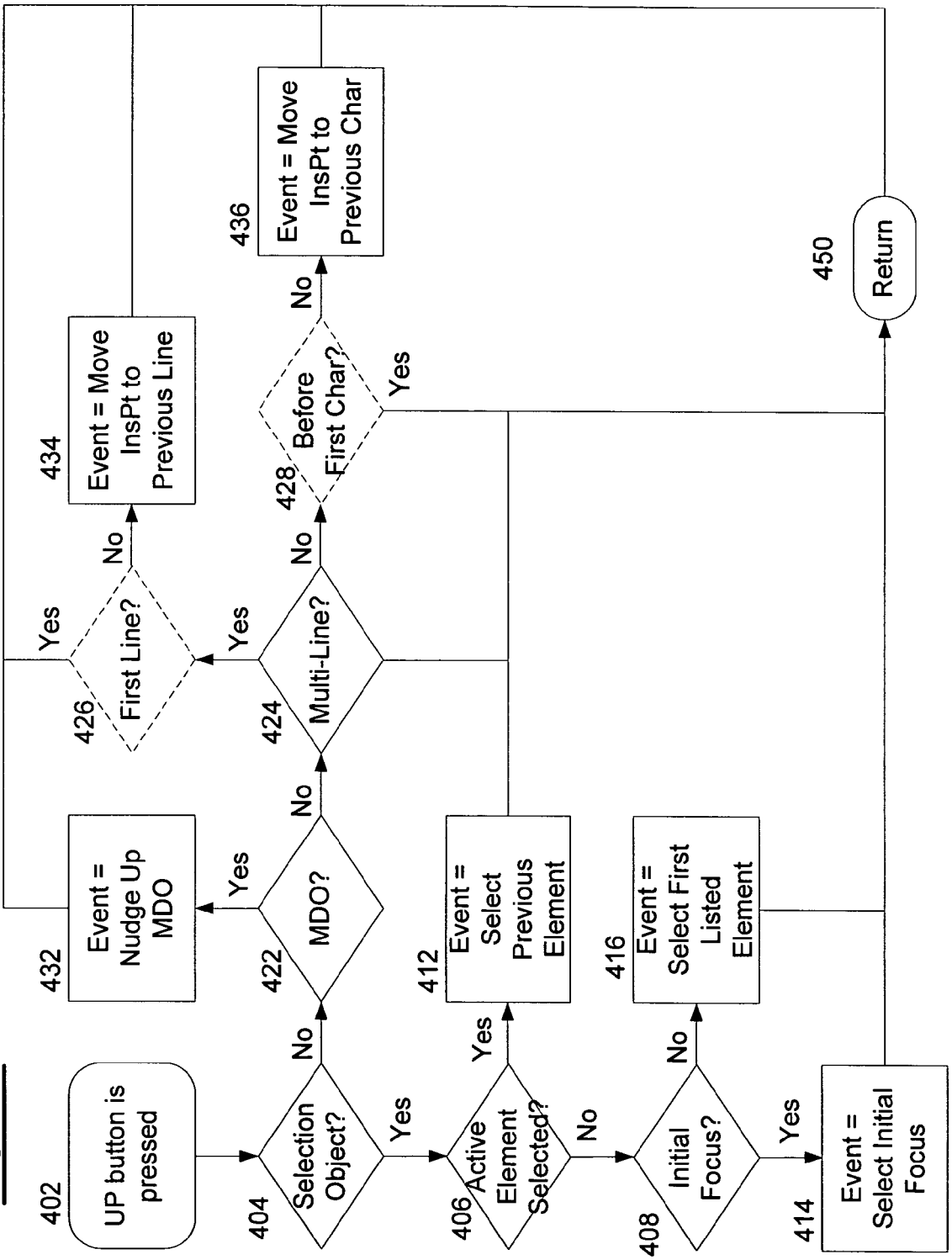

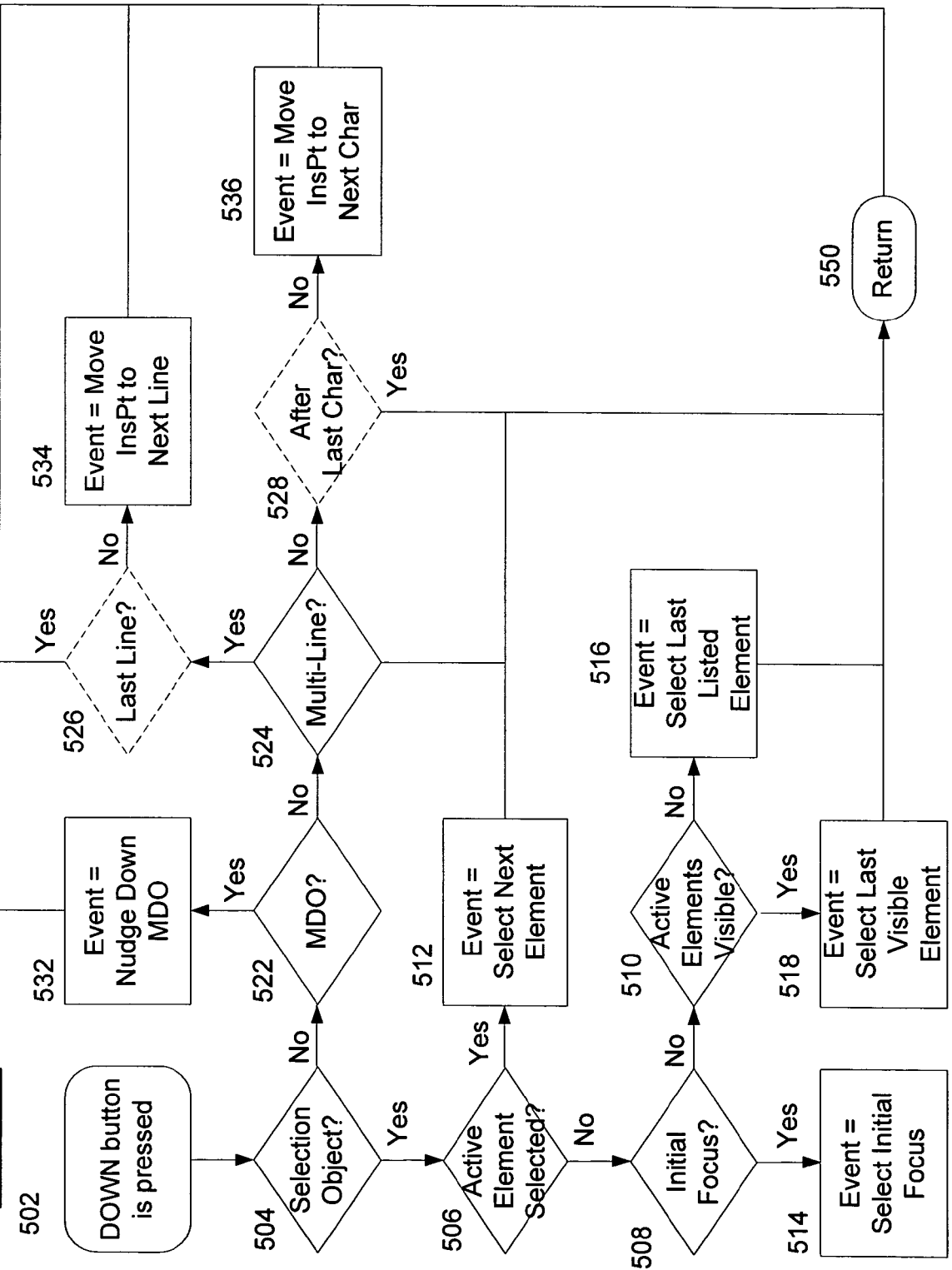

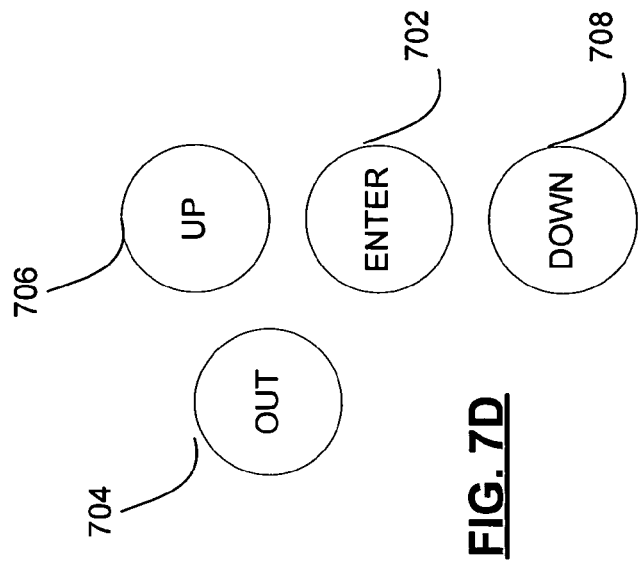
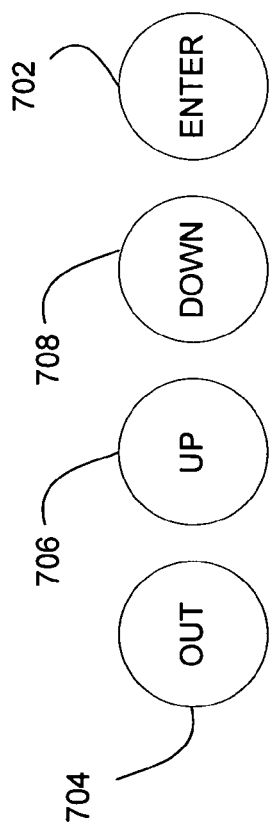
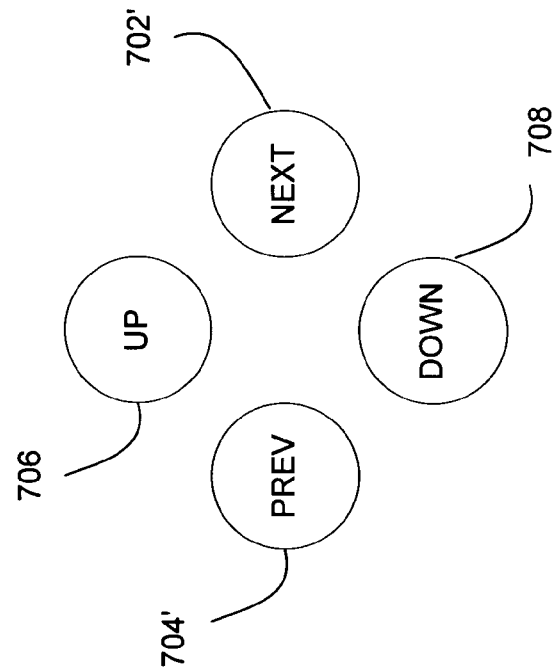

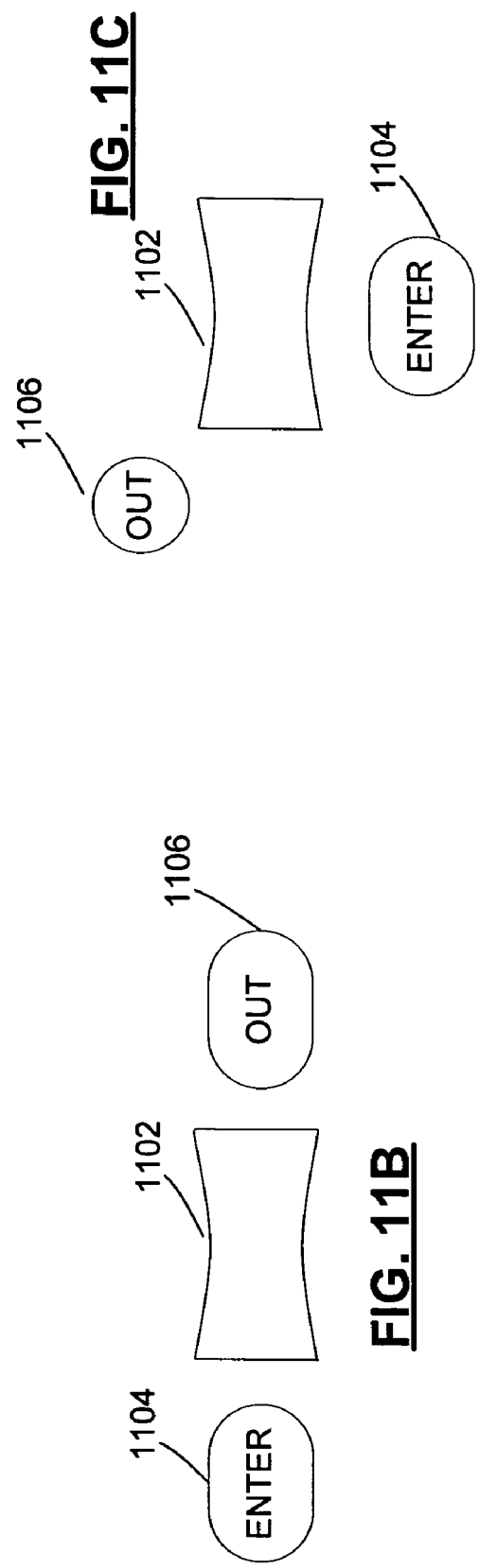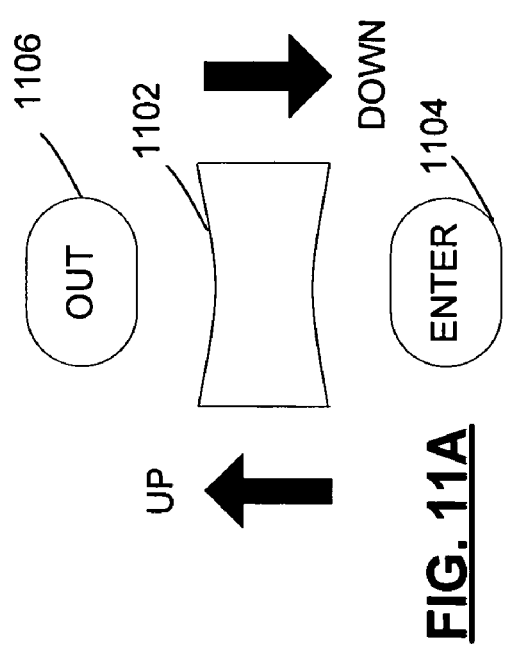

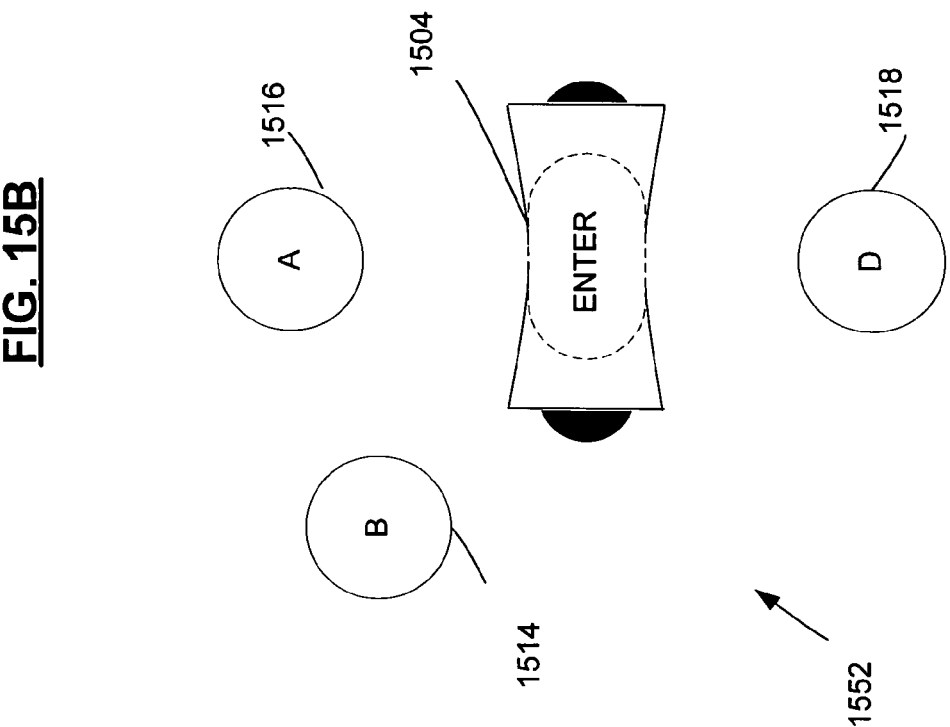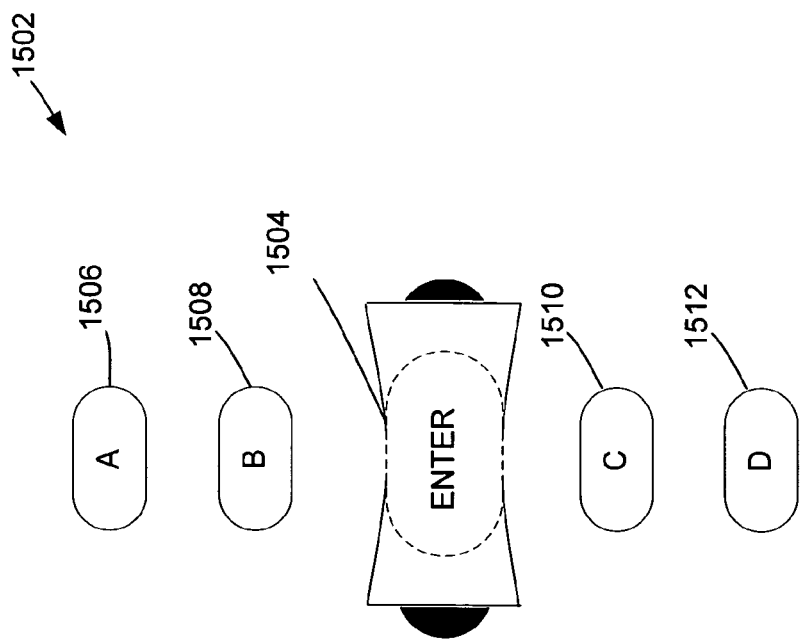

FIG. 15C

| Logical Button | Activation | Event | Keyboard |
|---|---|---|---|
| SDB | Roll Up | UP | Up (arrow) |
| SDB | Roll Down | DOWN | Down (arrow) |
| SDB | Rock Left | PREV | Alt-Tab |
| SDB | Rock Right | NEXT | Tab |
| SDB | Press (Click) | ENTER | Enter |
| Button A | Press | SWTCH | Alt-Esc |
| Button B | Press | OUT | Back/Esc |
| Button C | Press | ENTER | Enter |
| Button D | Press | MORE | Shift-F10 |

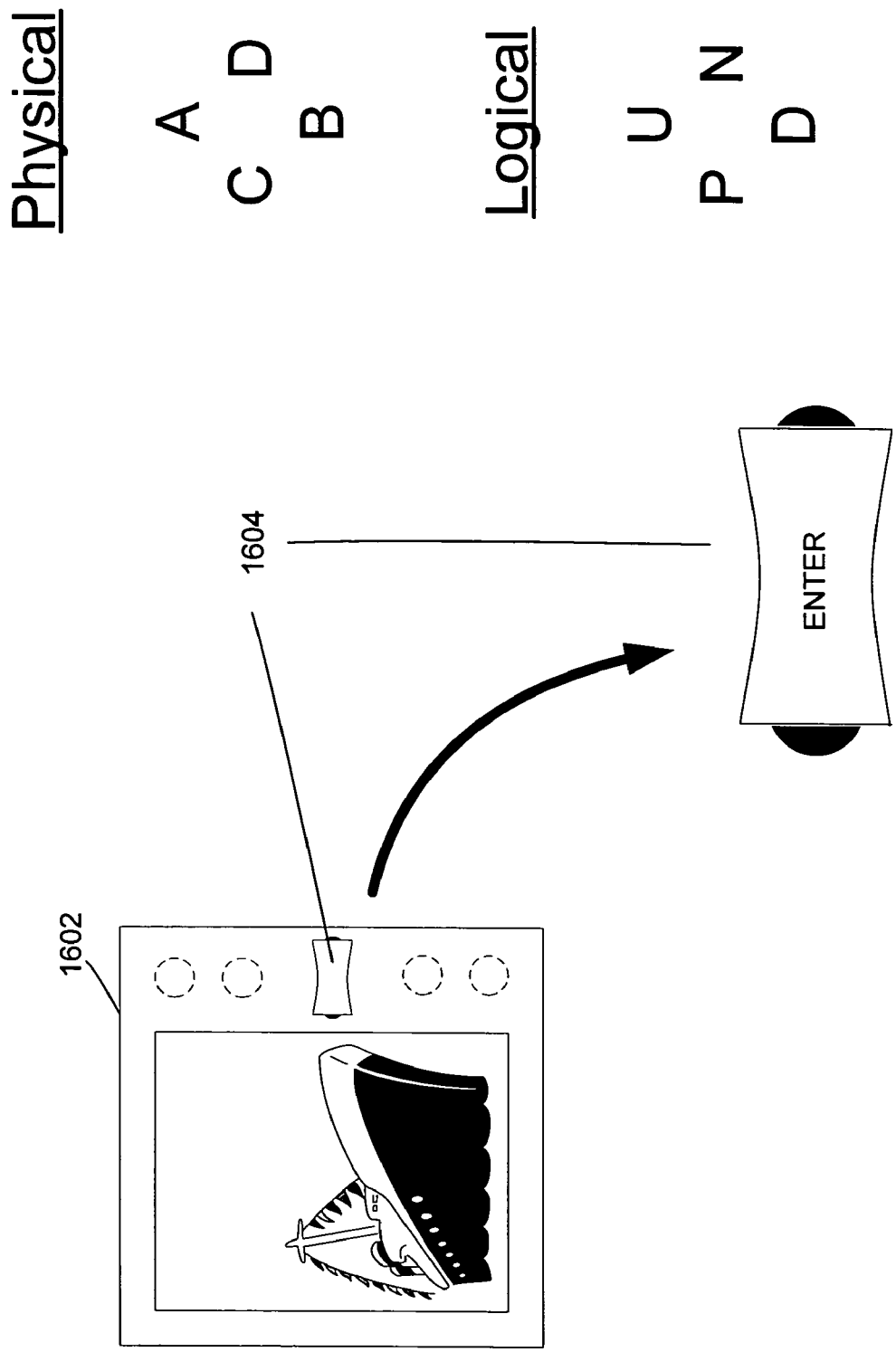

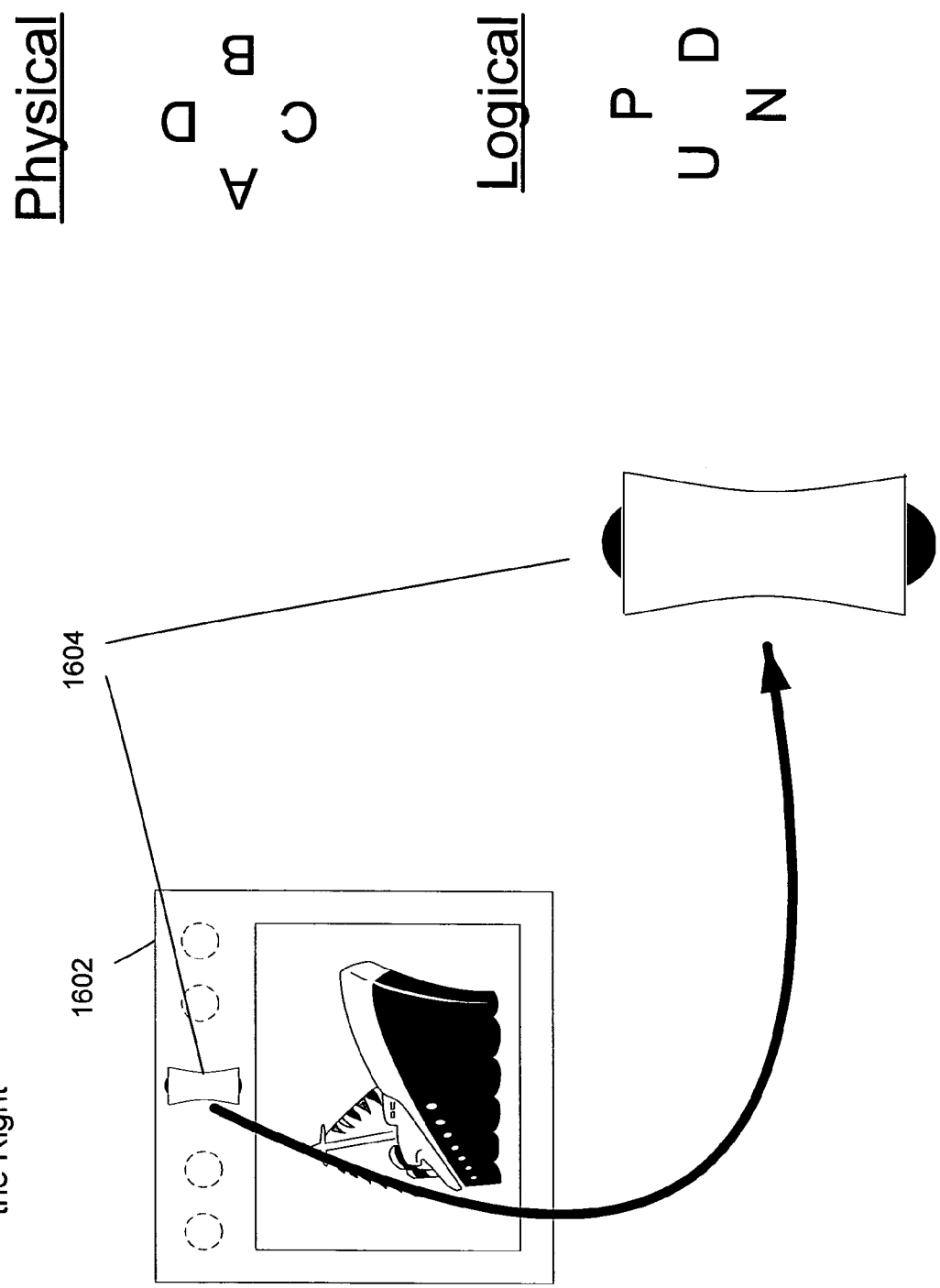

FIG. 17

| Physical Orientation: | Logical Orientation Based on Rotation | | | |
|---|---|---|---|---|
| | Original | 90-deg | 180-deg | 270-deg |
| A | U | D | D | U |
| B | D | U | U | D |
| C | P | P | N | N |
| D | N | N | P | P |

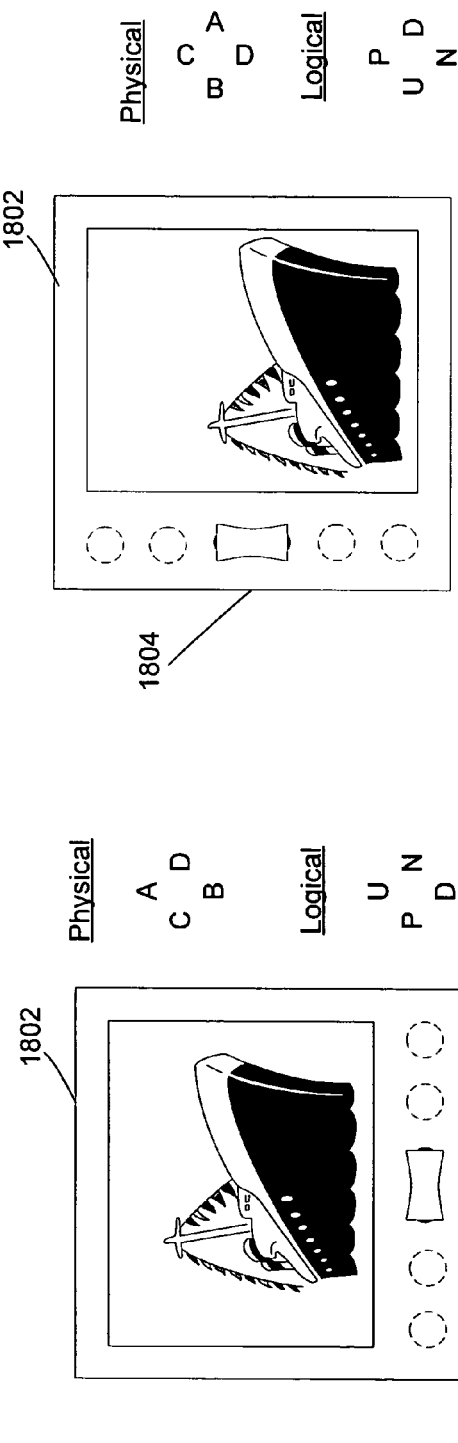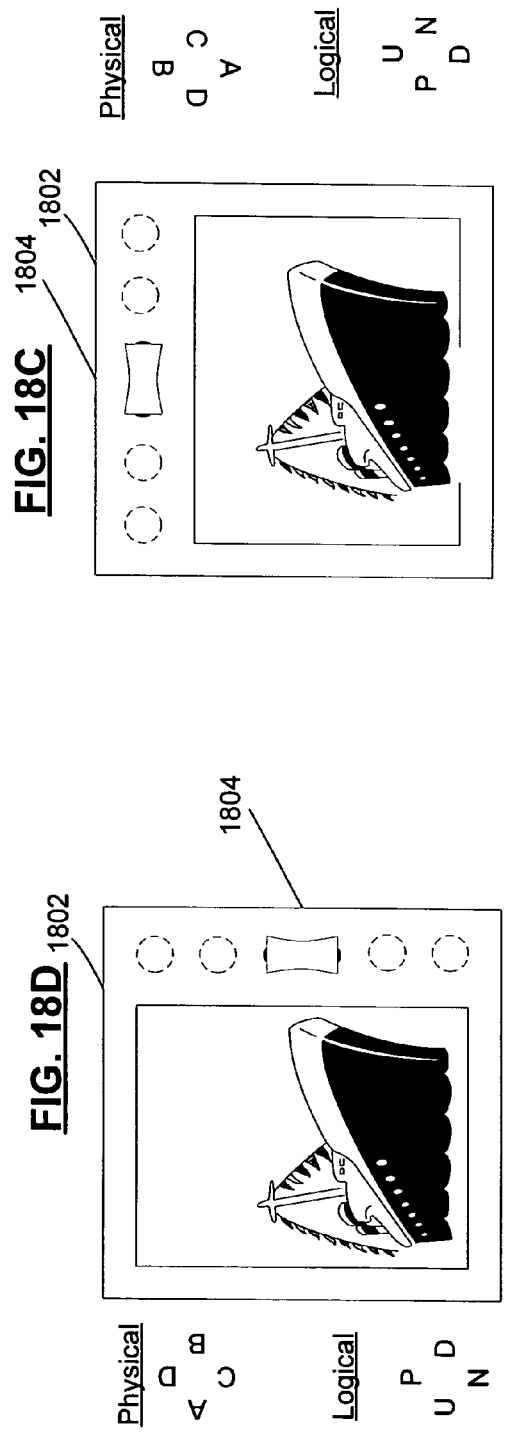
FIG. 18A  FIG. 18B  FIG. 18C  FIG. 18D

SYSTEMS AND METHODS FOR INTERFACING WITH COMPUTER DEVICES

CROSS-REFERENCE TO RELATED APPLICATIONS

This application is a continuation of U.S. Utility patent application Ser. No. 10/430,996, entitled "SYSTEMS AND METHODS FOR INTERFACING WITH COMPUTER DEVICES", filed May 5, 2003 now abandoned, which claims benefit of U.S. Provisional Patent Application No. 60/433,914, entitled "SYSTEMS AND METHODS FOR INTERFACING WITH COMPUTER DEVICES", filed Dec. 16, 2002, both of which are hereby incorporated by reference herein in their entirety.

This application is related by subject matter to the inventions disclosed in the following commonly assigned applications which also claim priority to the aforementioned provisional application: U.S. patent application Ser. No. 10/430,609, filed May 5, 2003, and U.S. patent application Ser. No. 10/768,779, filed Jan. 30, 2004, which claims priority from U.S. patent application Ser. No. 10/430,609, both entitled "SYSTEMS AND METHODS FOR INTERFACING WITH COMPUTER DEVICES"; U.S. patent application Ser. No. 10/431,068, filed May 5, 2003, and U.S. patent application Ser. No. 10/769,691, filed Jan. 30, 2004, which claims priority from U.S. patent application Ser. No. 10/431,068, both entitled "SYSTEMS AND METHODS FOR INTERFACING WITH COMPUTER DEVICES"; U.S. patent application Ser. No. 10/430,610, filed May 5, 2003, and U.S. patent application Ser. No. 10/765,742, filed Jan. 26, 2004, which claims priority from U.S. patent application Ser. No. 10/430,610, both entitled "SYSTEMS AND METHODS FOR INTERFACING WITH COMPUTER DEVICES"; and U.S. patent application Ser. No. 10/430,990, filed May 5,2003, and U.S. patent application Ser. No. 10/769,027, filed Jan. 30, 2004, which claims priority from U.S. patent application Ser. No. 10/430,990, both entitled "SYSTEMS AND METHODS FOR INTERFACING WITH COMPUTER DEVICES".

FIELD OF THE INVENTION

The present invention relates generally to the fields of user interfaces and, more particularly, to user interfaces for navigation in a computer environment. The invention, however, is not limited to use in a computer. On the contrary, the invention could be used in a wide variety of everyday devices or other such system using various embodiments of the invention as disclosed herein.

BACKGROUND OF THE INVENTION

The computer industry has long focused on the use of keys, wheels, and on-screen buttons for navigation—so much so, in fact, that a full-size keyboard, application-specific command buttons, mouse, and several on-screen interfaces are together necessary to support the various and diverse navigation models employed today. However, present navigation devices are not suitable for new and innovative computerized technologies—such as the Tablet PC which is seeking to become the evolutionary successor to the laptop—and navigating these new and developing technologies is not fully or adequately supported by keyboard, mouse, or other existing devices or combinations thereof. In short, the computer industry has not adequately addressed the readily apparent need in the art for a simpler model for navigation to compliment or replace other existing models.

SUMMARY OF THE INVENTION

The present invention is directed toward a user navigation interface that, in various embodiments, is very well suited for use in a computer system environment, although the invention is not limited to use in a computer. The present invention provides a system and method for enhanced user navigation to compliment (and not necessarily replace) a computer keyboard and mouse by providing a single user navigation interface that is more robust than a mouse but less complicated than a keyboard. In many embodiments, it is anticipated that the invention will be employed as a device requiring only one hand for utilization (like a mouse) but having substantial functionality that, until now, has only been directly callable via a computer keyboard.

In certain embodiments of the present invention, a user interface system comprising an interface that enables a user to generate a logical input for one of a group of commands to be applied to an object, said group of commands comprising a minimally necessary group of commands is disclosed. In one alternative embodiment, the minimally necessary group of commands comprises four user commands for the user interface system such as ENTER, UP, DOWN, and OUT. In other embodiments, certain commands may be implemented by operation of a variations of a wheel or dogbone device (described later herein).

Other embodiments of the present invention disclose methods for combining the functionality a set of at least two command calls (including but not limited to keyboard keys) into a single logical button, in some embodiments by prioritizing the set of command calls from first to last and then using an operating system shell hook to make an application command call for all but the last command in order of priority until one is "accepted" (recognized and executed) or, if all are "rejected" (not recognized) but the last, then issuing the last command as a operating system command. For example, while OUT can equate to the Back or to the Escape command calls in certain alternative embodiments, an important combination used in many other embodiments of the present invention are the merger of the Back and Escape command calls into an OUT command. This method of cascading commands by using an operating system shell hook to issue a command as an application command to an application and, if the application command is rejected, issuing a different command directly to the operating system, is in many embodiments the key to successful functionality in a relatively simple, single-handed navigation device. Other embodiments employ other strategies for extending the core command functionality afforded by a limited number of logical buttons.

Among the various cascading embodiments, certain cascading combinations are particularly beneficial for numerous embodiments of the present invention. Some of the cascade events denoted by their logical button name and their corresponding cascading commands (high priority commands to progressively lower priority commands) are as follows:

UP: APPCOMMAND_UP→Up Arrow→Scroll Up→Page Up
DOWN: APPCOMMAND_DOWN→Down Arrow→Scroll Down→Page Down
NEXT: APPCOMMAND_NEXT→Tab→Right Arrow
PREV: APPCOMMAND_PREV→Shift-Tab→Left Arrow
ENTER: APPCOMMAND_ENTER→Return→Enter→"Play"
OUT: APPCOMMAND_OUT→Browser Back→Escape→"Stop"→Alt-F4

SWITCH: APPCOMMAND_SWITCH→Alt-Escape→Alt-Tab→Windows Key→Home
MENU: APPCOMMAND_MENU→Shift-F10→"Settings"

As used herein, "Play" and "Stop" are special commands for specific contexts such as media applications, and "Setting" is also a special command for a setting menu or the like in other specific contexts.

Other alternative embodiments disclose methods and systems for logically remapping commands to buttons for a navigational device coupled to a physically rotate-able display device by first determining an orientation for the display device and then logically remapping the commands to the logical buttons based on the orientation of the display device. In certain embodiments, if the display on the display device is changed to a different orientation, presumably to match a change in a physical orientation of the display device, then the logical mapping of the commands to the logical buttons occurs automatically. In other embodiments, determining the orientation of the display is based on the orientation of display on the display device itself. In some specialized embodiments, where a navigational interface is asymmetrical vertical to horizontal, logical remapping remaps the commands to the logical buttons in a predetermined manner consistent with logical use by an end-user.

Additional alternative embodiments disclose system and products for extending the functionality of a navigational control device by mapping a substitute command to a logical button for when the button is engaged in a predetermined manner other than the primary manner in which the logical button is engaged (e.g., double-clicking, flicking, press-and-hold, etc.) so that a substitute command can in fact be issued.

BRIEF DESCRIPTION OF THE DRAWINGS

The foregoing summary, as well as the following detailed description of embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 4A is a flow chart depicting the logic for the UP button in certain embodiments of the present invention;

FIG. 5B is a flow chart depicting a variation in the logic for the DOWN button in certain embodiments of the present invention;

FIG. 7C illustrates another alternative embodiment of the present invention showing the buttons arranged horizontally;

FIG. 7D illustrates another embodiment of the present invention illustrating the buttons arranged in a modified vertical manner;

FIG. 7E illustrates an alternative four button arrangement in certain embodiments of the present invention;

FIG. 11A illustrates a dogbone/button combination in certain embodiments of the present invention;

FIG. 11B illustrates an alternative layout for an embodiment of the dogbone/button combination in certain embodiments of the present invention;

FIG. 11C illustrates an alternative layout for an embodiment of the dogbone/button combination in certain embodiments of the present invention;

FIG. 15A illustrates a nine-button device;

FIG. 15B illustrates an eight-button device;

FIG. 15C is a table listing the direct commands (or logical input) for each button in FIG. 15A;

FIG. 16A illustrates a display device in a "right-handed portrait" orientation with a rocking dogbone attached to the right side thereof;

FIG. 16D is an illustration of the device of FIG. 16C rotated yet another ninety degrees to the right (now 270 degrees total, or three-quarters to the right) forming a "top landscape";

FIG. 17 is a table representative, for certain embodiments of the present invention which employ a logical rotation scheme for a fixed navigational device such that the logical buttons correspond to specific commands depending on their orientation, of the exact mapping of commands to logical buttons in various orientations;

FIG. 18A illustrates an alternative display device in a "front-end landscape" orientation with a rocking dogbone integrated at the base of the device;

FIG. 18B illustrates the device of FIG. 18A rotated one-quarter to the right;

FIG. 18C illustrates the device of FIG. 18A rotated one-half to the right;

FIG. 18D illustrates the device of FIG. 18A rotated three-quarters to the right;

DETAILED DESCRIPTION OF ILLUSTRATIVE EMBODIMENTS

Introduction

The subject matter is described with specificity to meet statutory requirements. However, the description itself is not intended to limit the scope of this patent. Rather, the inventors have contemplated that the claimed subject matter might also be embodied in other ways, to include different elements or combinations of elements similar to the ones described in this document, in conjunction with other present or future technologies.

Computer Environment

Figure 1:
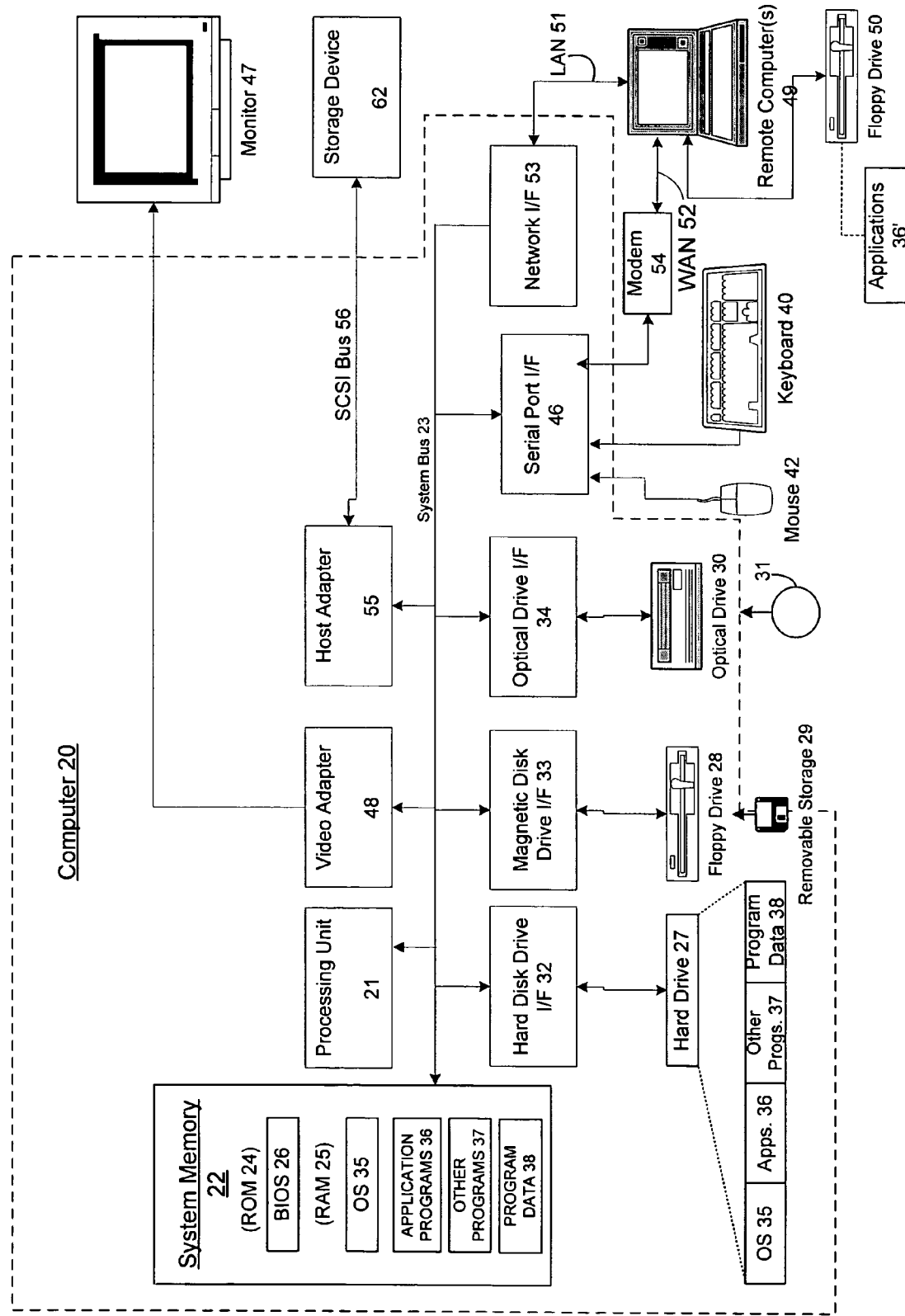
FIG. 1 is a block diagram representing a computer system in which aspects of the present invention may be incorporated.

Numerous embodiments of the present invention may execute on a computer. FIG. 1 and the following discussion is intended to provide a brief general description of a suitable computing environment in which the invention may be implemented. Although not required, the invention will be described in the general context of computer executable instructions, such as program modules, being executed by a computer, such as a client workstation or a server. Generally, program modules include routines, programs, objects, components, data structures and the like that perform particular tasks or implement particular abstract data types. Moreover, those skilled in the art will appreciate that the invention may be practiced with other computer system configurations, including hand held devices, multi processor systems, microprocessor based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the personal computer 20, such as during start up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise wide computer networks, intranets and the Internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

While it is envisioned that numerous embodiments of the present invention are particularly well-suited for computerized systems, nothing in this document is intended to limit the invention to such embodiments. On the contrary, as used herein the term "computer system" is intended to encompass any and all devices comprising press buttons, or capable of determining button presses, or the equivalents of button presses, regardless of whether such devices are electronic, mechanical, logical, or virtual in nature.

Network Environment

Figure 2:
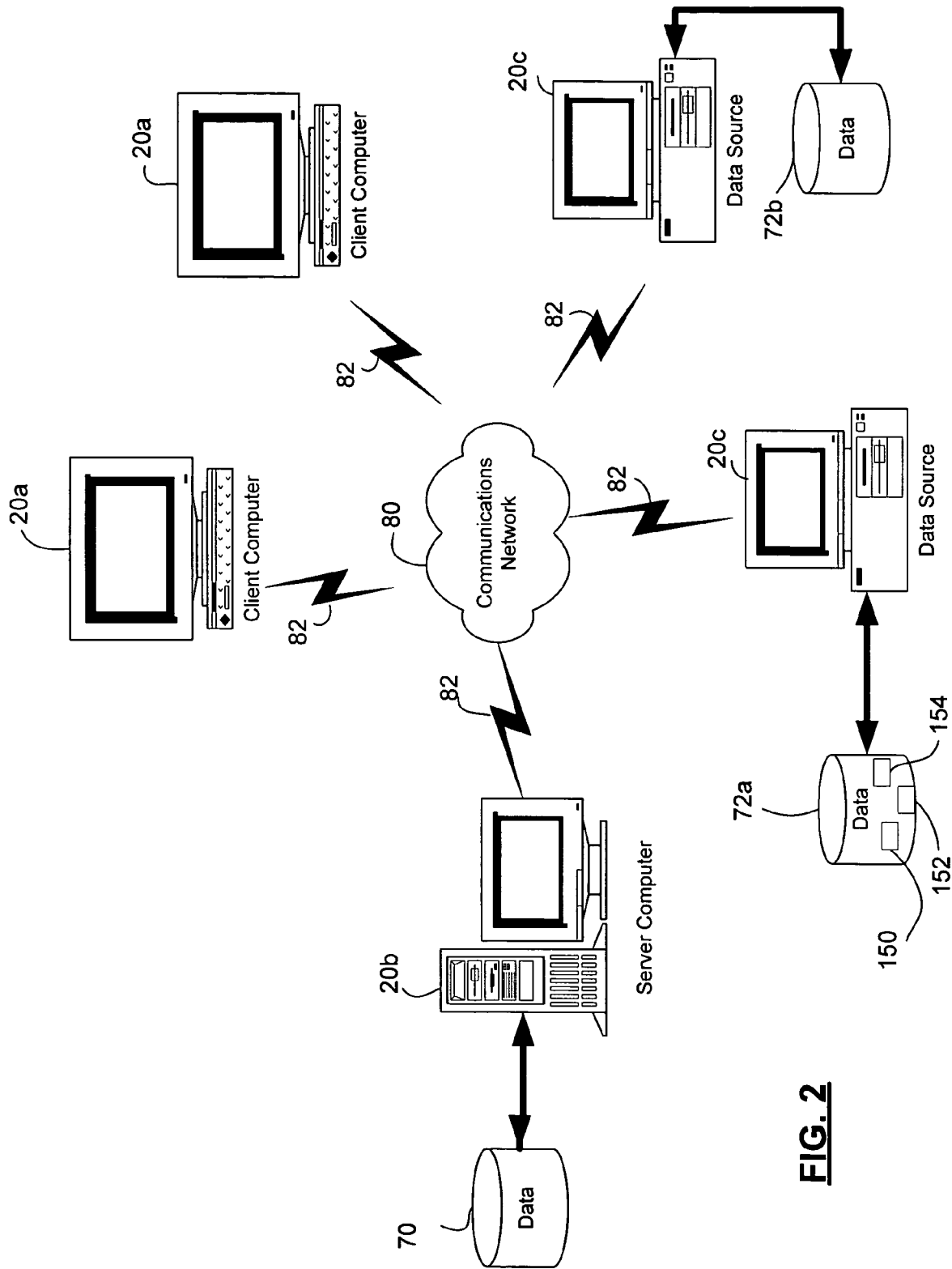
FIG. 2 is a schematic diagram representing a network in which aspects of the present invention may be incorporated.

FIG. 2 illustrates an exemplary network environment in which aspects of the present invention may be employed. Of course, actual network and database environments can be arranged in a variety of configurations; however, the exemplary environment shown here provides a framework for understanding the type of environment in which the present invention operates.

The network may include client computers 20a, a server computer 20b, data source computers 20c, and databases 70, 72a, and 72b. The client computers 20a and the data source computers 20c are in electronic communication with the server computer 20b via communications network 80, e.g., an Intranet. Client computers 20a and data source computers 20c are connected to the communications network by way of communications interfaces 82. Communications interfaces 82 can be any one of the well-known communications interfaces such as Ethernet connections, modem connections, and so on.

Server computer 20b provides management of database 70 by way of database server system software, described more fully below. As such, server 20b acts as a storehouse of data from a variety of data sources and provides that data to a variety of data consumers.

In the example of FIG. 2, data sources are provided by data source computers 20c. Data source computers 20c communicate data to server computer 20b via communications network 80, which may be a LAN, WAN, Intranet, Internet, or the like. Data source computers 20c store data locally in databases 72a, 72b, which may be relational database servers, excel spreadsheets, files, or the like. For example, database 72a shows data stored in tables 150, 152, and 154. The data provided by data sources 20c is combined and stored in a large database such as a data warehouse maintained by server 20b. Client computers 20a that desire to use the data stored by server computer 20b can access the database 70 via communications network 80. Client computers 20a request the data by way of SQL queries (e.g., update, insert, and delete) on the data stored in database 70.

Overview

An "object" as described herein for certain embodiments of the present invention below constitute, without limitation, a dialog box, menu, web page, text page, movable drawing object, or some other such item in a computer system as such are known and appreciated by those of skill in the art. For the purpose of describing the invention, it will be presumed that all objects can be conveniently divided into one of four categories: (1) selection objects, such as a dialog box, menu, etc., where a user selects an element from among a plurality of elements; (2) content objects, such as an editable text object; (3) movable drawing objects (MDOs); and (4) audio objects. While in reality more categories are possible and desirable, the inclusion of such categories would merely require a person of sufficient skill in the relevant art to extend the logic described herein in order to accommodate the unique characteristics of such additional object groups, and thus such extensions should be deemed anticipated and disclosed by the present invention.

Whenever a button is pressed, or a wheel or a dogbone (described later herein) is rolled, turned, or rocked on an input device, such elemental physical interactions create appropriate electronic signals constituting a logical input for use with the invention as described herein (as such logical inputs are widely known and appreciated by those of sufficient skill in the relevant art). Of course, logical inputs resulting from physical interaction with input devices other than buttons, wheels, or dogbones (e.g., voice recognition input, infra-red signal input, patent recognition input, and so on and so forth without limitation) would be suitable for use with the various embodiments of the invention disclosed herein, and thus nothing herein should be interpreted to limit logical inputs to merely the group of devices explicitly disclosed herein. However, for convenience, references to the elements available for physical interactions (e.g., a button) shall constitute a direct reference to the logical input resulting from each such physical interaction. In other words, input device elements—including buttons, wheels, dogbones, and other such devices—shall constitute logical inputs for the embodiments described herein when physically acted upon. Thus, by way of unlimited example only, an "ENTER button" is one form of a "logical input for ENTER."

At the heart of the various embodiments of the present invention is a main button/wheel/dogbone group which provides the basis for an interface device that users can immediately identify and use to navigate information in a simple and consistent way. The embodiments generally comprises a core group of logical buttons for a minimally necessary group of commands (core commands) and, in some embodiments, additional logical buttons for a secondary set of navigation commands (secondary commands). Logical buttons, which may comprise individual buttons or the logical equivalent of a distinct input event from a wheel or dogbone (more fully defined and described later herein), or even a combination of logical buttons, are utilized by the various embodiments to produce the core commands and secondary commands. In other embodiments, comprising relatively few physical components but possessing a substantial number of logical button, tremendous navigational functionality is possible that goes far beyond core commands and secondary commands, but may also include general commands which, in some cases, may be object, application, or device specific and/or revisable.

The core commands in numerous embodiments of the present invention are roughly equivalent to the Up, Down, Enter and Escape keyboard key events since these are the command calls most commonly associated with scanning and selecting, the two most fundamental functions of navigation—that is, scanning views and choices, and accepting or rejecting among the views and choices. While the Up and Down arrow keys are not the only way to scan, they are the most well-established for this foundational user task because menus, lists, and scrolling views are all arranged along the vertical axis and already respond to the use of these two keys. This association, in turn, forms the basis for the user's conceptual model in the present invention regarding the scanning axis. Similarly, the Enter key is almost universally known by computer users as a fairly dependable way to activate or execute whatever function is currently selected on the screen (a graphical user interface or GUI), and Escape is generally regarded as the semantic opposite of Enter, handling many common back-out scenarios such as closing mail messages or closing dialog boxes. However, an important aspect for many embodiments of the present invention is that the functions of navigation may vary based on context and application object being navigated, and additional functions of navigation may be implemented via the secondary commands.

In regard to the Escape function, another important aspect of various embodiments of the invention described herein is that, despite the fact that the traditional Escape function has been adequate to date, the long-standing implementation of the Escape function is actually quite limited—to limited, in fact, to serve as a core command for many of the embodiments of the invention described herein. For example, to close a window object in an application, it is widely understood that most windows do not in fact respond to the Escape key but instead only respond to the 'Alt-F4' keyboard keying. Also, in regard to applications having a navigational "history"—that is, where navigation is along a logical path of some sort that is often the result of navigation any kind of tree-structured data or other such objects—the act of closing the window is not nearly as important nor as widely used as the need and desire of the user to go Back (that is, keeping the window open and returning to previous or different content within the current context based on viewing history). Therefore, in numerous embodiments of the present invention, we have replaced the concept of Escape with the more powerful "Out" (described in detail later herein) for the OUT button, although other embodiments will continue to map Escape or Back to OUT when appropriate.

Based on this rationale, various embodiments of the present invention are for a device with four logical buttons for OUT, UP, DOWN, and ENTER to collectively represent the core navigation commands, and this primary group of functionality is the foundation of many enhanced embodiments of the invention utilizing secondary commands. This foundational group of buttons and corresponding functionality vis-à-vis the core commands can be tailored to a unending variety of user applications. For example, four basic navigation button functions, or "navbuttons," may be applied to various and diverse control surfaces such as wireless displays, remote controls, key fobs, wrist watches, smart phones, music devices, and other such user applications without limitation, whether or not such are considered traditional computing devices.

Furthermore, for embodiments that disclose a result that is visual in nature, such as an effect visible on a display monitor, non-visual effects are also anticipated and included. For example, if a set of buttons is described as moving a cursor up or down on a display device, an alternative embodiment is anticipated where the effect is non-visual, such as an audible effect (e.g., increasing or decreasing volume) or a tactile effect (e.g., the temperature of a heating surface increases or decreases). Therefore, nothing herein should be interpreted to limit the various embodiments of the present invention to visually-oriented results as non-visual results are fully anticipated herein.

Finally, the many of the embodiments disclosed herein, while ideal in a stand-alone device, might also be incorporated as part of a larger device. For example, it is anticipated that many embodiments might manifest themselves as a cluster of buttons on a keyboard (possibly between the cluster of arrow keys and the cluster of paging keys), alongside a display (along with other buttons and interfaces), as virtual button in a touch screen (or any other virtual embodiment), and so on and so forth without limitation. In any event, nothing herein should be interpreted to limit any aspect of the invention to stand-alone embodiments.

Core Commands and Related Embodiments

The following commands comprise some of the key core commands used herein throughout and how they may be interpreted by the system in specific contexts:

UP: to move (step) up one unit, line, cell, scroll increment, page, or screen; an MS Windows APPCOMMAND_NAVPAD_UP event; or a USB HID NAVPAD_UP event.

DOWN: to move (step) down one unit, line, cell, scroll increment, page, or screen; an MS Windows APPCOMMAND_NAVPAD_DOWN event; or a USB HID event NAVPAD_DOWN event.

NEXT: to move (skip) to the next object, field, link, or pane; an MS Windows APPCOMMAND_NAVPAD_NEXT event; or a USB HID NAVPAD_DOWN event.

PREV: to move (skip) to the previous object, field, link, or pane; an MS Windows APPCOMMAND_NAVPAD_PREV event; or a USB HID NAVPAD_PREV event.

ENTER: to take action (execute) on the current object (similar to the Enter key on a keyboard or an OK button in other contexts); MS Windows APPCOMMAND_NAVPAD_ENTER event; or a USB HID NAVPAD_ENTER event.

CENTER: to take action (execute) on the current object (similar to but distinct from the Enter key on a keyboard); MS Windows APPCOMMAND_NAVPAD_CENTER event; or a USB HID NAVPAD_CENTER event.

OUT: return to a previously open object, page, or view; close the active object (similar to the Esc, Back, or a cascading Esc/Back combination described elsewhere herein, as appropriate to the context); MS Windows APPCOMMAND_NAVPAD_OUT event; or a USB HID NAVPAD_OUT event.

MORE: display details about, or execute, options available for the current object; MS Windows APPCOMMAND_NAVPAD_MORE event; or a USB HID NAVPAD_MORE event.

SWITCH: switch to the next window, screen, page, application, or functional offering; MS Windows APPCOMMAND_NAVPAD_SWITCH event; or a USB HID NAVPAD_SWITCH event.

Figure 3B:
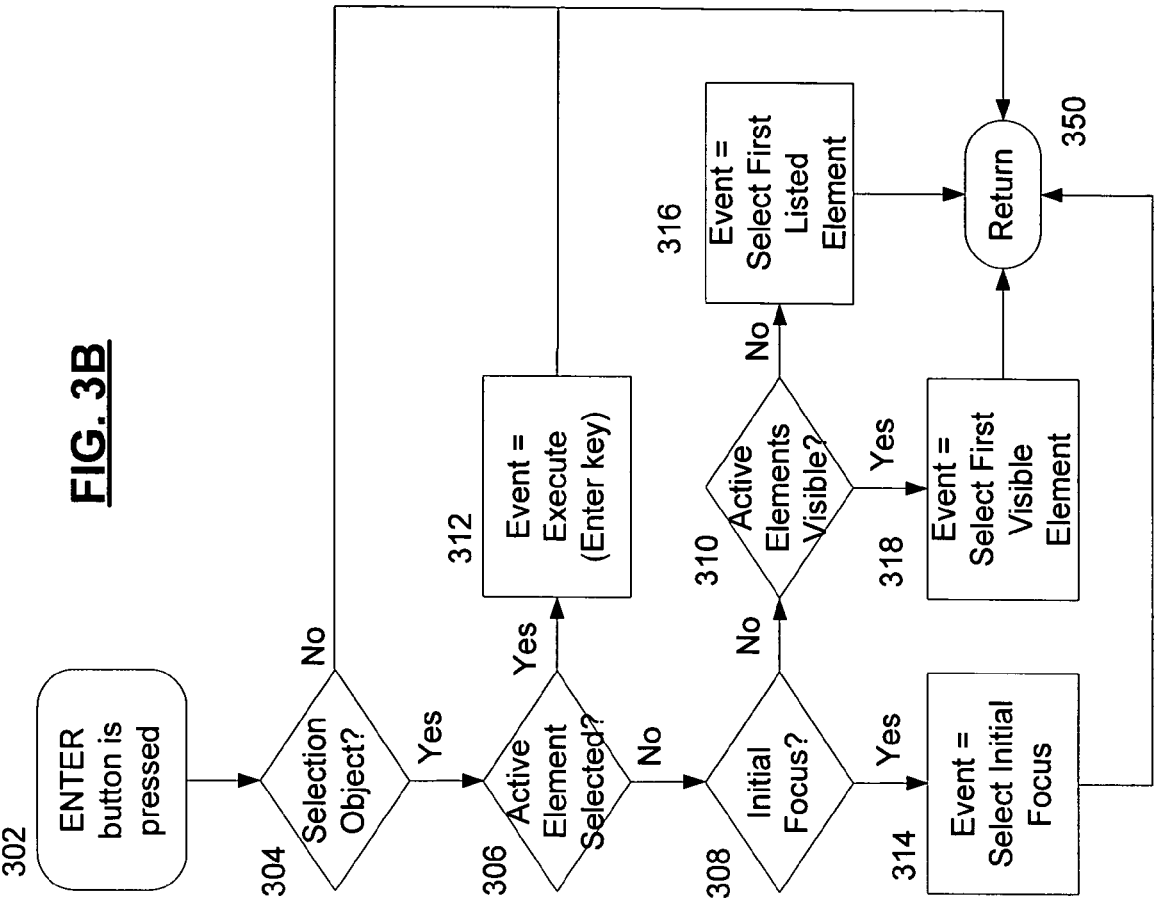
FIG. 3B which is a flow chart depicting a variation in the logic for the ENTER button in certain embodiments of the present invention.
Figure 3A:
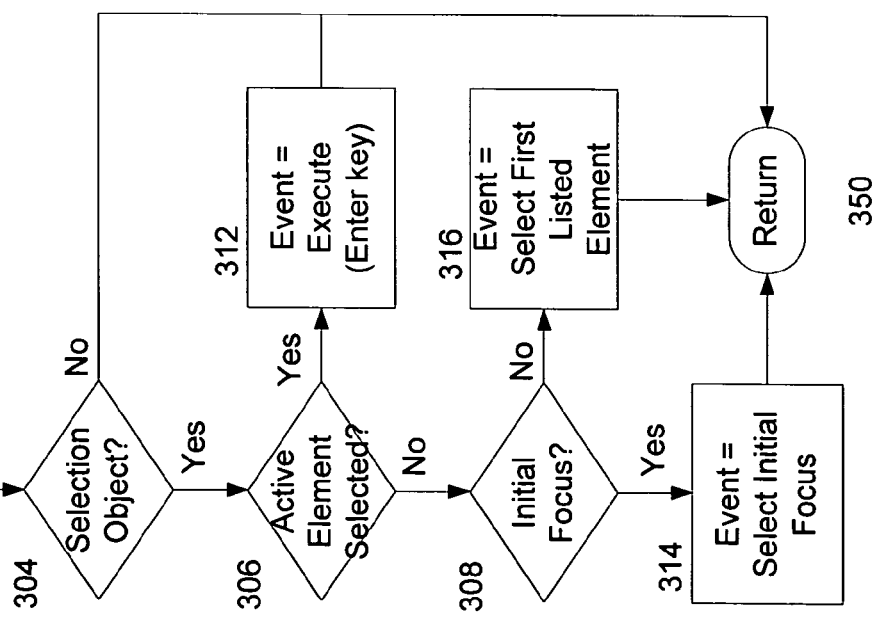
FIG. 3A is a flow chart depicting the logic for the ENTER button in certain embodiments of the present invention.

FIG. 3A is a flow chart depicting the logic for the ENTER button in certain embodiments of the present invention. When the ENTER button is pressed at block 302, the ENTER button system determines, at block 304, if the object is a selection object (and not a content object or a movable drawing object) and, if not, for the present embodiment no other event occurs and the system returns at block 350. (Events other than the null event of the present invention are certainly possible for content objects and movable drawing objects, as will be appreciated by those possessing sufficient skill in the relevant art.) On the other hand, if the object is in fact a selection object, at block 306 the system determines if an active element in the object is already selected. If an active element is already selected, at block 312 an "execute" event occurs that is equivalent to depressing the Enter key on a keyboard (and which results in an Open, Accept, or OK of the selected element as appropriate, and as such events are known and appreciated by those of skill in the art); the system then returns at block 350. On the other hand, if an active element is not already selected, then at block 308 the system then makes a determination as to whether an element of the object has been marked as the Initial Focus (as a default selection element) and if so, then at block 314 the element marked as the Initial Focus is selected and thereafter the system returns at block 350. Finally, if there is no Initial Focus, then at block 316 the system selects the first listed element of the object and returns at block 350.

Naturally, variations to the logic flow depicted in FIG. 3B can and will be desirable under certain circumstances. For example, consider FIG. 3B which is a flow chart depicting just such a variation in the logic for the ENTER button depicted in FIG. 3A. In this embodiment—and after already determining (a) at block 304 that the object is a selection object, (b) at block 306 that an active element has not already been selected, and (c) at block 308 that the object has no Initial Focus (identical to the method of FIG. 3A)—at block 310 the system of FIG. 3B further determines whether any active elements are visible and, if so, at block 318 would then select the first visible element or, if not, at block 316 the system would then select the first listed element. This and other such subtle variations in logic are herein disclosed by the present invention.

Note that by using the method of these particular embodiments, as well as others herein, it is expected that, in certain circumstances, a user may press the ENTER button once to select an element (when one is not already selected) and then press the ENTER button again to execute the element (equivalent to depressing the Enter key on the keyboard).

FIG. 4A is a flow chart depicting the logic for the UP button in certain embodiments of the present invention. When the UP button is pressed at block 402, the UP button system determines, at block 404, if the object is a selection object. If not, at block 422 the system determines if the object is a content object or a movable drawing object. If the object is an movable drawing object, at block 432 the system simply nudges (moves) the object up a predetermined distance (for example, one pixel) or, as presumed here (and in other places in the figures), does nothing if further movement in that direction is not possible or allowed. Although logic is not demonstrated at this point for handling such a "null event" when movement in the desired direction is not possible or allowed, a sample of such logic is illustrated in the figure by hash-line blocks and is described later herein only for content objects, although such logic can and should be presumed and implied for the rest of the figures where appropriate.

Returning again to the figure, if the object is in fact a content object, then at block 424 the system determines if the text in the object consists of one line or more than one line. If the text object consists of more than one line, then (to demonstrate the logic for handling a "null event" when movement in the desired direction is not possible or allowed as alluded to earlier herein) at block 426 the system further determines if the insertion point is presently on the first line and, if so, then the system does nothing and returns at block 450; otherwise, at block 434 the system moves the insertion point up one line and then returns at block 450. Conversely, if the text object consists of just one line, then at block 428 determines if the insertion point is presently before the first character of the line and, if so, then the system does nothing and returns at block 450; otherwise, at block 436 the system moves the insertion point one character to the left and then returns at block 450.

If at block 404 the system determines that the object is indeed a selection object, then at block 406 the system determines if an active element in the object is already selected. If an active element is already selected, at block 412 the system selects the previous element in the list (and, by implication, the previously selected element is un-selected) and the system then returns at block 450. On the other hand, if an active element is not already selected, then at block 408 the system then makes a determination as to whether an element of the object has been marked as the Initial Focus (as a default selection element) and if so, then at block 414 the element marked as the Initial Focus is selected and thereafter the system returns at block 450. Finally, if there is no Initial Focus, then at block 416 the system selects the first listed element of the object and returns at block 450.

Figure 4B:
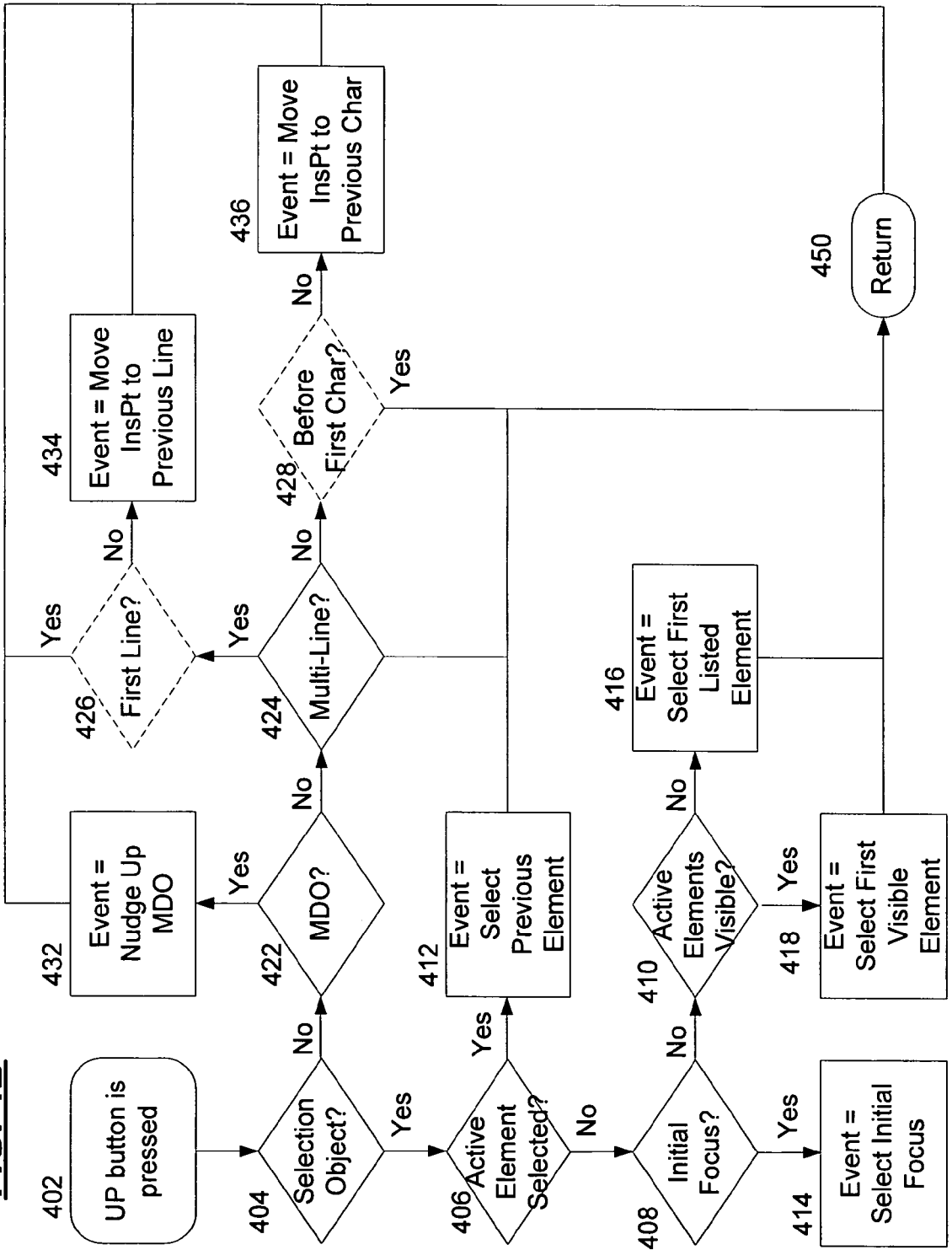
FIG. 4B is a flow chart depicting a variation in the logic for the UP button in certain embodiments of the present invention.

FIG. 4B is a flow chart depicting a variation in the logic for the UP button depicted in FIG. 4A based on a similar variation to that introduced earlier herein to distinguish FIG. 3B from FIG. 3A. In the embodiment of FIG. 4B—and, once again, after already determining (a) at block 404 that the object is a selection object, (b) at block 406 that an active element has not already been selected, and (c) at block 408 that the object has no Initial Focus (identical to the method of FIG. 4A)—at block 410 the system of FIG. 4B further determines whether any active elements are visible and, if so, at block 418 would then select the first visible element or, if not, at block 416 the system would then select the first listed element.

Figure 5A:
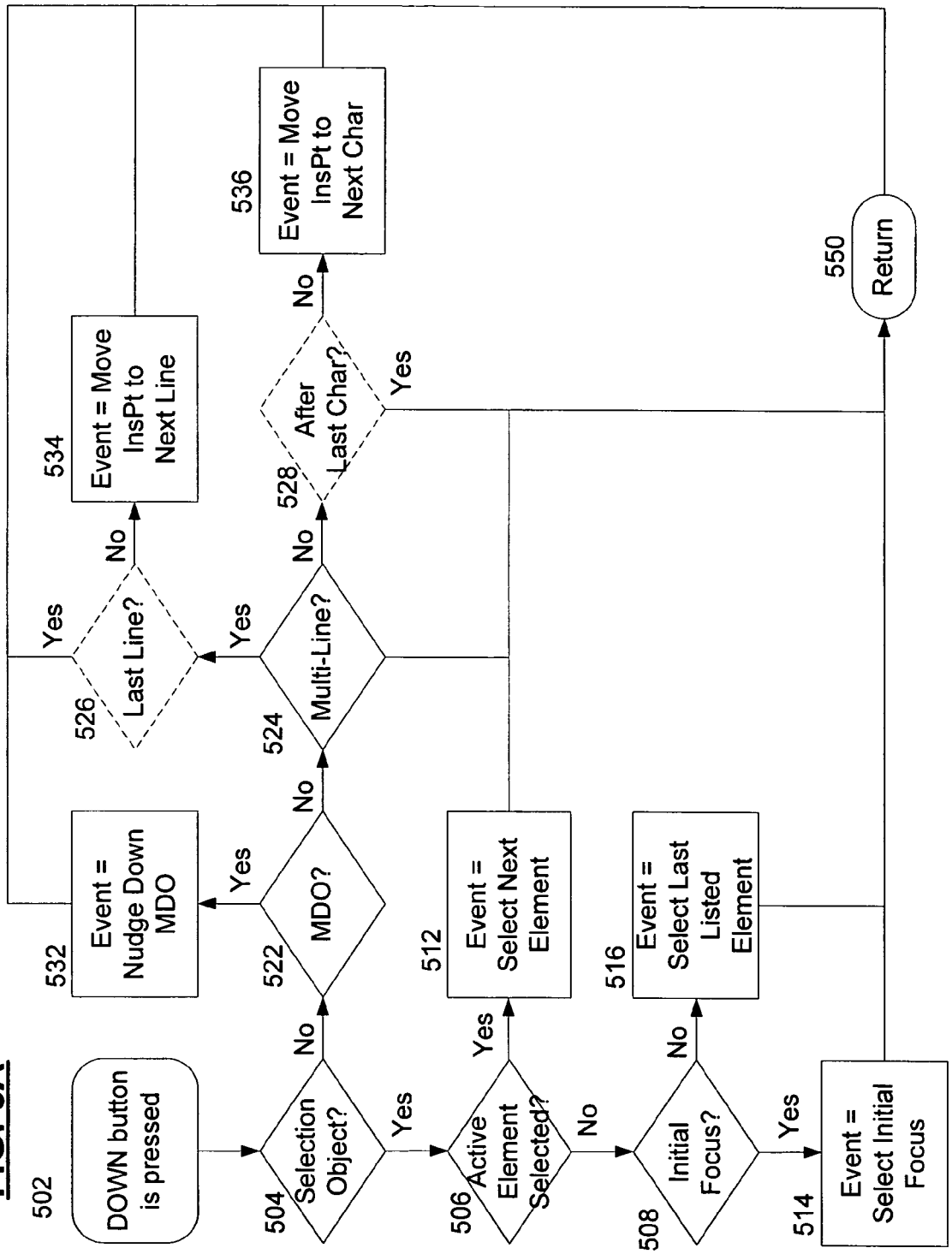
FIG. 5A is a flow chart depicting the logic for the DOWN button in certain embodiments of the present invention.

FIG. 5A is a flow chart depicting the logic for the DOWN button in certain embodiments of the present invention. When the DOWN button is pressed at block 502, the DOWN button system determines, at block 504, if the object is a selection object. If not, at block 522 the system determines if the object is a content object or a movable drawing object. If the object is an movable drawing object, at block 532 the system simply nudges (moves) the object down a predetermined distance (for example, one pixel) or, as presumed here (and in other places in the figures), does nothing if further movement in that direction is not possible or allowed. On the other hand, if the object is a content object, then at block 524 the system determines if the text in the object consists of one line or more than one line. If the text object consists of more than one line, then at block 526 the system further determines if the insertion point is presently on the last line and, if so, then the system does nothing and returns at block 550; otherwise, at block 534 the system moves the insertion point down one line and then returns at block 550. Conversely, if the text object consists of just one line, then at block 528 determines if the insertion point is presently after the last character of the line and, if so, then the system does nothing and returns at block 550; otherwise, at block 536 the system moves the insertion point one character to the right and then returns at block 550.

If at block 504 the system determines that the object is indeed a selection object, then at block 506 the system determines if an active element in the object is already selected. If an active element is already selected, at block 512 the system selects the next element in the list (and, by implication, the previously selected element is un-selected) and the system then returns at block 550. On the other hand, if an active element is not already selected, then at block 508 the system then makes a determination as to whether an element of the object has been marked as the Initial Focus (as a default selection element) and if so, then at block 514 the element marked as the Initial Focus is selected and thereafter the system returns at block 550. Finally, if there is no Initial Focus, then at block 516 the system selects the last listed element of the object and returns at block 550.

FIG. 5B is a flow chart depicting a variation in the logic for the DOWN button depicted in FIG. 5A based on a similar variation to that introduced earlier herein to distinguish FIG. 3B from FIG. 3A and FIG. 4B from FIG. 4A. In the embodiment of FIG. 5B—and, once again, after already determining (a) at block 504 that the object is a selection object, (b) at block 506 that an active element has not already been selected, and (c) at block 508 that the object has no Initial Focus (identical to the method of FIG. 5A)—at block 510 the system of FIG. 5B further determines whether any active elements are visible and, if so, at block 518 would then select the last visible element or, if not, at block 516 the system would then select the last listed element.

Despite the fact that the traditional Escape function has been long used, it is nevertheless quite limited and highly specialized. For example, to close a window, most windows do not in fact respond to the Escape key at all but instead only respond to the 'Alt-F4' keying. Also, in regard to applications having a navigational "history"—that is, where navigation is along a logical path of some sort—the act of closing the window is not nearly as important (nor as widely used) as the need and desire of the user to go Back (that is, keeping the window open and returning to previous or different content within the current context based on viewing history). Therefore, in regard to the OUT button, for certain embodiment of the present invention we replace the concept of Escape or Back with the more powerful concept of "Out".

In certain cascading embodiments, OUT may be the logical and managed combination of the functionality offered by both the Back and Escape command calls. In operating systems where all windows respond to Escape, the merging of these two buttons is highly beneficial since these keys are rarely used fully and consistently in various application contexts. Of course, in those few application contexts where Back and Escape are both utilized and each having distinguishable functions, it would be impractical and inefficient to expect a user to guess which keyboard key the OUT button would be replicating. One solution presented by certain embodiments of the present invention is to use the OUT button to generate a Back key command when that command is understand by the application at issue, and to instead generate and Escape key command when the Back key command is not understood by the application—that is, to Cascade a Back command followed by an Escape command. In this way, applications with a history—and, as such, where the ability to move Back is more frequent and important than closing a window via Escape—gain the greater benefit of Back key functionality, while applications with no Back key functionality automatically gain whatever functionality is therein afforded by the Escape key. To implement this methodology of Back/Escape key selection via the OUT button, certain embodiments of the present invention herein disclosed first use an operating system shell hook to generate a Back key command as an "App Command" (an application command to the application program) and then, if this Back command is rejected by the application, then generating an Escape command equivalent to depressing the Escape key on a keyboard. Of course, other embodiments may simply map Escape or Back to OUT as appropriate, and nothing contained herein is intended to limit the underlying functionality of OUT; nevertheless, we will herein presume that OUT refers to the cascading functionality of Back/Escape.

Figure 6B:
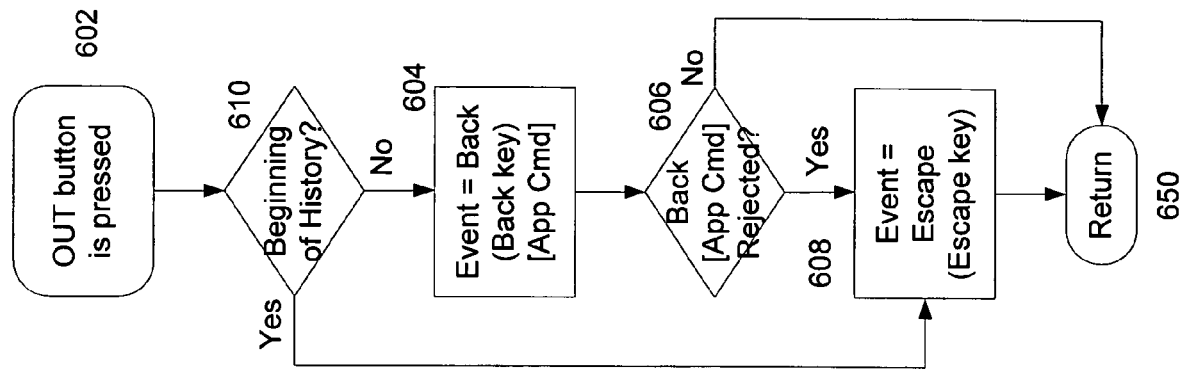
FIG. 6B is a flow chart depicting more complex logic for the method of the OUT button in certain embodiments of the present invention.
Figure 6A:
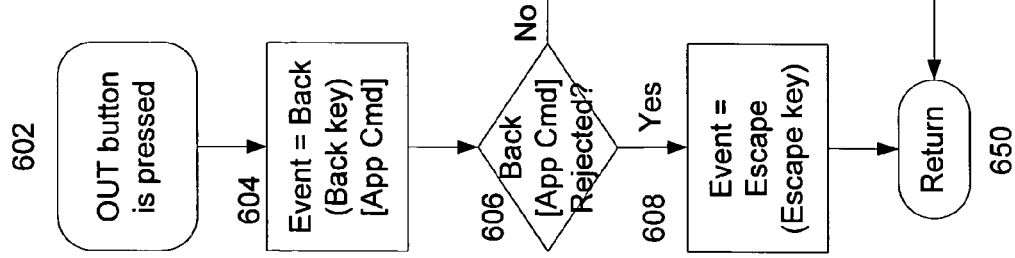
FIG. 6A is a flow chart depicting the logic for the method of the OUT button in certain embodiments of the present invention.

FIG. 6A is a flow chart depicting the logic for the method of the OUT button in certain embodiments of the present invention. When the OUT button is pressed at block 602, at block 604 the OUT button system, using an operating system shell hook, issues to the application an application command equivalent to the command generated by a user depressing the Back key on a keyboard (which is also sometimes labeled as the Browser Back key or some other equivalent, the operation of which is also sometimes implemented as a right-click on a mouse). Then, at block 606 the system determines whether or not the Back application command was rejected and, if not, at block 650 the system returns; otherwise, at block 608 the system issues an Escape command and then at block 650 returns.

FIG. 6B is a flow chart depicting more complex logic for the method of the OUT button based on the methodology illustrated in FIG. 6A. In FIG. 6B, when the OUT button is pressed at block 602, at block 610 the system first ascertains whether the window is at the beginning of its history (and thus has nowhere to go "back" to). In just such a case, the method could do one of two things: (a) it could ignore the OUT button (a null event) and immediately return or, better yet, (b) it could close the window via an Escape. To implement this latter option, one of two methods could be employed: (i) the system could proceed to send a Back command and, when this application command is presumably rejected by the application (since there is nowhere to go "back" to), the system proceeds to send an Escape command (which is the methodology reflected in FIG. 6A), or (ii) the system could immediately send an Escape command, which is depicted in the present figure. Thus, if the system does indeed determine that the window is at the beginning of its history at block 610, then the system immediately proceeds to block 608 and issues an Escape command and then returns at block 650. Otherwise, at block 604, and again using an operating system shell hook, the system issues to the application an application command for Back and, then at block 606, the system determines whether or not the Back application command was rejected and, if not, at block 650 the system returns, otherwise at block 608 the system issues an Escape command and then returns at block 650.

Figure 7B:
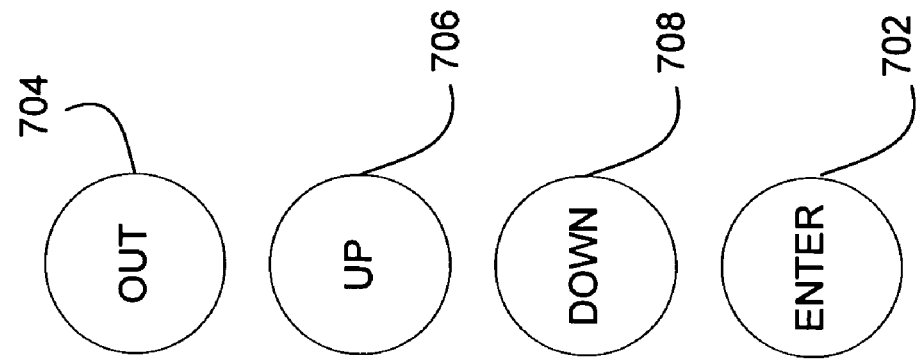
FIG. 7B illustrates an alternative embodiment of the present invention having a similar orientation but with the four buttons arranged vertically.
Figure 7A:
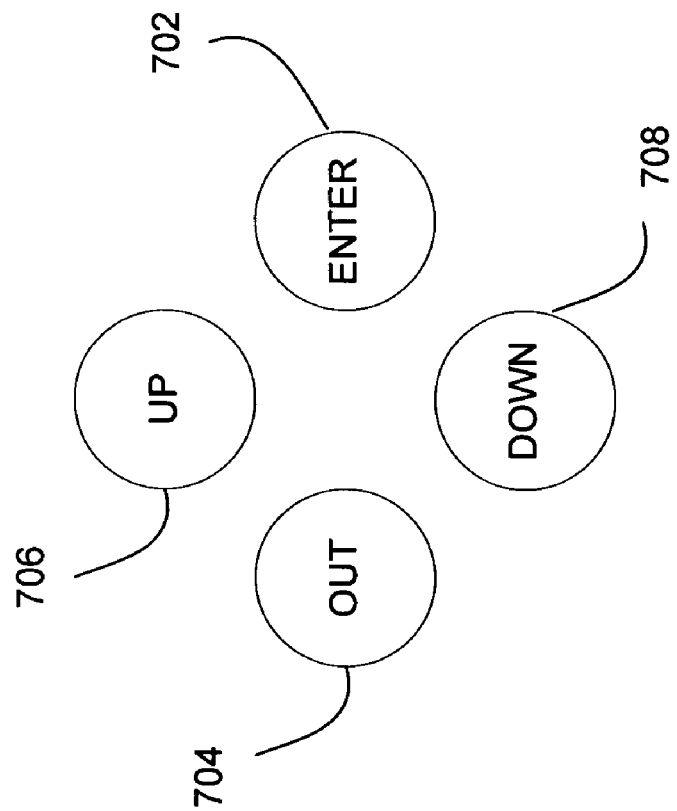
FIG. 7A illustrates a four button arrangement in certain embodiments of the present invention.

Several different physical embodiments of the present invention are certainly possible. One such embodiment, illustrated in FIG. 7A, is a four button arrangement, such as on a pad or device, comprising ENTER 702, OUT 704, UP 706, and DOWN 708 buttons arranged in a diamond shape as illustrated. FIG. 7B is an alternative embodiment of the present invention having a similar orientation but with the four buttons arranged vertically, such as along the right edge of a computing device. FIG. 7C is another alternative embodiment of the present invention showing the buttons arranged horizontally, such as along the front edge of a computing device. FIG. 7D, on the other hand, is yet another embodiment of the present invention illustrating the button arranged in a modified vertical manner with ENTER 702 in the center, UP 706 and DOWN 708 vertically above and below ENTER 702 respectively, and OUT 704 to the upper left of the three linearly arranged buttons. Of course, a different combination of commands might be appropriate four certain four- button devices, and the device of FIG. 7E illustrates a device similar to that of FIG. 7A except that the four buttons of this device correspond to the command UP, DOWN, PREV, and NEXT.

Figure 8C:
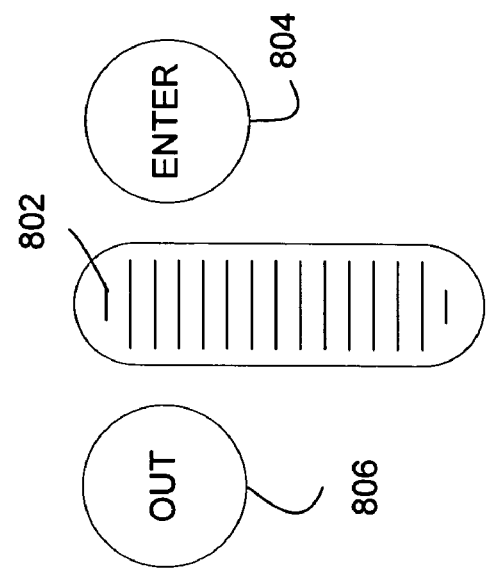
FIG. 8C illustrates an alternative layout for an embodiment of the wheel/button combination in certain embodiments of the present invention.
Figure 8B:
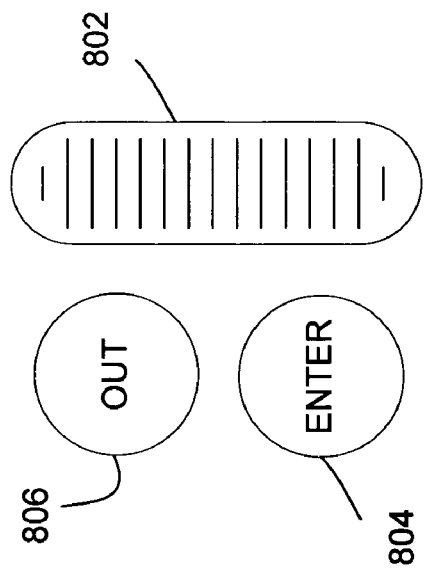
FIG. 8B illustrates an alternative layout for an embodiment of the wheel/button combination in certain embodiments of the present invention.
Figure 8A:
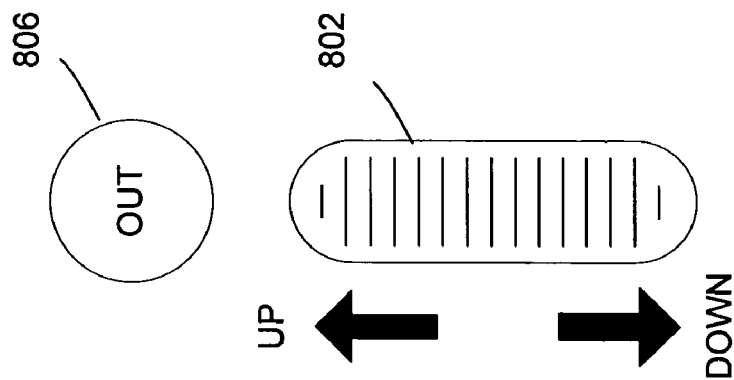
FIG. 8A illustrates a wheel/button combination in certain embodiments of the present invention.

However, as the four-button schema disclosed herein is logical and not physical, certain embodiments of the present invention may also utilize differing physical components. For example, one embodiment of the present invention, as illustrated in FIG. 8A, comprises a wheel/button combination with one vertical wheel 802 and two buttons 804 and 806 where the wheel 802 logically equates to both the UP and DOWN functions based on the direction the wheel is turned (up or down respectively, as illustrated in the figure), while the buttons 804 and 806 correlate to ENTER and OUT respectively when pressed. The wheel 802 in this embodiment may operate in a manner similar to a wheel on a mouse device such that each slight roll of the wheel up or down constitutes input—as well known and appreciated in the art. FIG. 8B illustrates an alternative layout for an embodiment of the wheel/button combination, and yet another such layout for an embodiment is illustrated in FIG. 8C.

Figure 9:
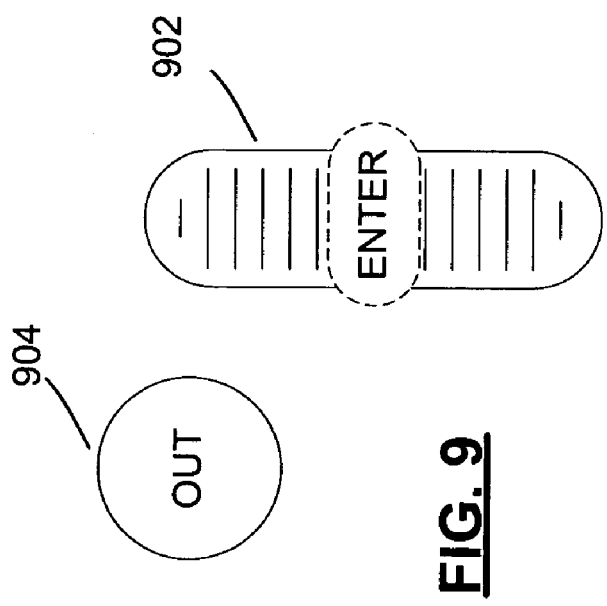
FIG. 9 illustrates a clicking wheel.

FIG. 9 illustrates another alternative embodiment of the present invention where the wheel 902 not only supports up and down movement corresponding to UP and DOWN but also, when a predetermined minimum threshold of pressure is applied, acts as a button for ENTER. This press entry feature enables the wheel 902, referred to herein as a clicking wheel, to receive three distinct inputs, while the fourth input, OUT, corresponds to a button 904 in near proximity to the clicking wheel 902.

Figure 10:
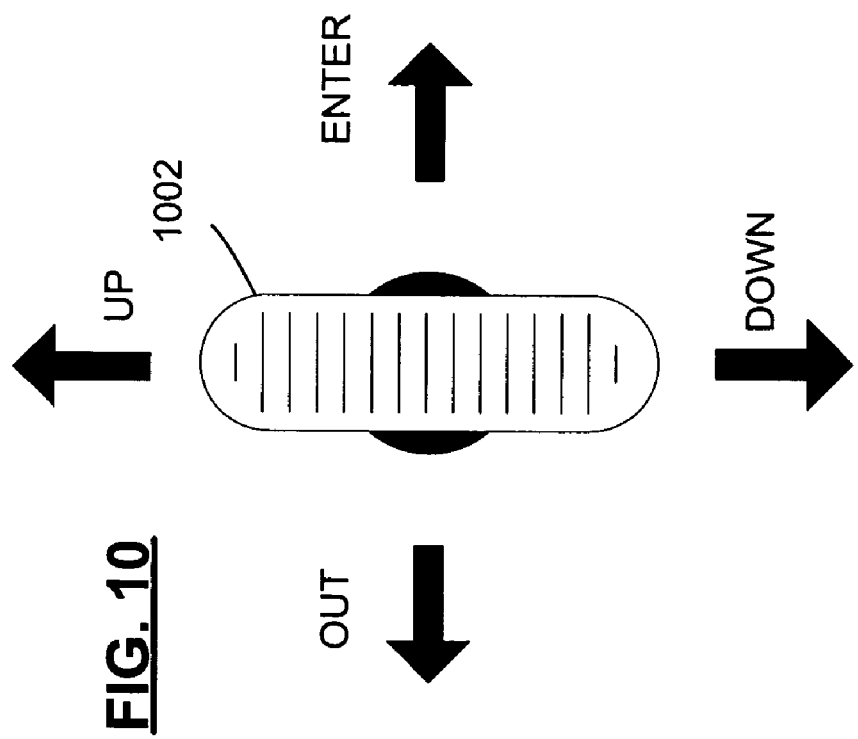
FIG. 10 illustrates a rocking wheel.

In another embodiment of the present invention, as illustrated in FIG. 10, the four-button schema is employed by a single physical element, the rocking wheel 1002. The rocking wheel 1002 is similar to a regular wheel except that it further supports a side-to-side rocking movement without compromising vertical rolling movement. With this capability, rocking left correlates to ENTER and rocking right correlates to OUT, while UP and DOWN continue to derive from the up and down rolling of the wheel 1002 (as illustrated in the figure). Moreover, if the rocking wheel illustrated for the present embodiment further incorporates the press entry of the clicking wheel in FIG. 9, such an embodiment would gain a fifth button capability which could be employed in some of the 5+button configurations which offers some additional interesting embodiments discussed in detail later herein.

FIG. 11A illustrates an alternative embodiment of the present invention that is similar to the invention disclosed in FIG. 8A but, instead of a traditional wheel, a dogbone 1102 is utilized. A dogbone 1102 is essentially an ergonomically modified wheel device that is particularly well-suited for engagement by the thumb, whereas a traditional wheel is better-suited for use by the index finger. In this embodiment, the vertical up or down rolling movement of the dogbone 1102 logically equates to both the UP and DOWN functions respectively (as illustrated in the figure), while the buttons 1104 and 1106 correlate to ENTER and OUT respectively when pressed. FIG. 11B illustrates an alternative layout for an embodiment of the dogbone/button combination, and yet another such layout for an embodiment is illustrated in FIG. 11C.

Figure 12:
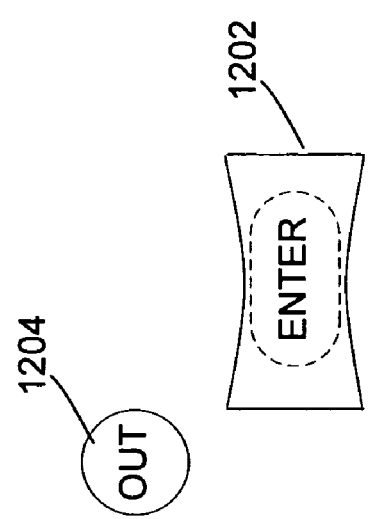
FIG. 12 illustrates clicking dogbone.

FIG. 12 illustrates another alternative embodiment of the present invention where the dogbone 1202 not only supports up and down movement corresponding to UP and DOWN but also, when a predetermined minimum threshold of pressure is applied, acts as a button for ENTER. This press entry feature enable the dogbone 1202, referred to herein as a clicking dogbone, to receive three distinct inputs, while the fourth input, OUT, corresponds to a button 1204 in near proximity to the clicking dogbone 1202.

Figure 13:
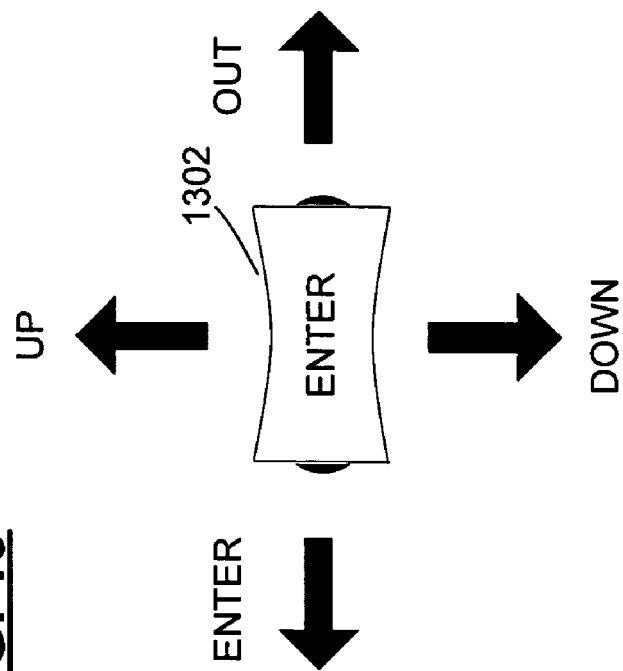
FIG. 13 illustrates a rocking dogbone.

Finally, in yet another embodiment of the present invention as illustrated in FIG. 13, the four-button schema is employed by a single physical element, the rocking dogbone 1302. The rocking dogbone 1302 is similar to the rocking wheel 1002 illustrated in FIG. 10 by further supporting a side-to-side rocking movement without compromising vertical rolling movement. With this capability, rocking the dogbone 1302 left correlates to ENTER and rocking right correlates to OUT, while UP and DOWN continue to derive from the up and down rolling of the dogbone 1302 (as illustrated in the figure).

Moreover, if the rocking dogbone illustrated for the present embodiment further incorporates the press entry of the clicking dogbone in FIG. 12, such an embodiment would gain a fifth button capability which could be employed in some of the 5+button configurations which offers some additional interesting embodiments discussed in detail later herein.

Extended Commands and Related Embodiments

The embodiments of the present invention so far disclosed herein have focused on a schema comprising four buttons (or logical equivalents to buttons in the case of the wheels and dogbones) directly mapping to the four foundational commands ENTER, UP, DOWN, and OUT. While there is no denying the power of such a simple schema comprising the most useful commands for navigating objects, a much broader range of functionality is available by extending the functionality of the buttons in one of four ways: physically, temporally, logically, and in-combination. For example, additional commands certain embodiments might map in addition to the four foundational commands ENTER, UP, DOWN, and OUT, include, for a six-logical-button embodiment, PREV and NEXT, and for an eight-logical-button embodiment PREV, NEXT, MORE, and SWITCH.

Figure 14A:
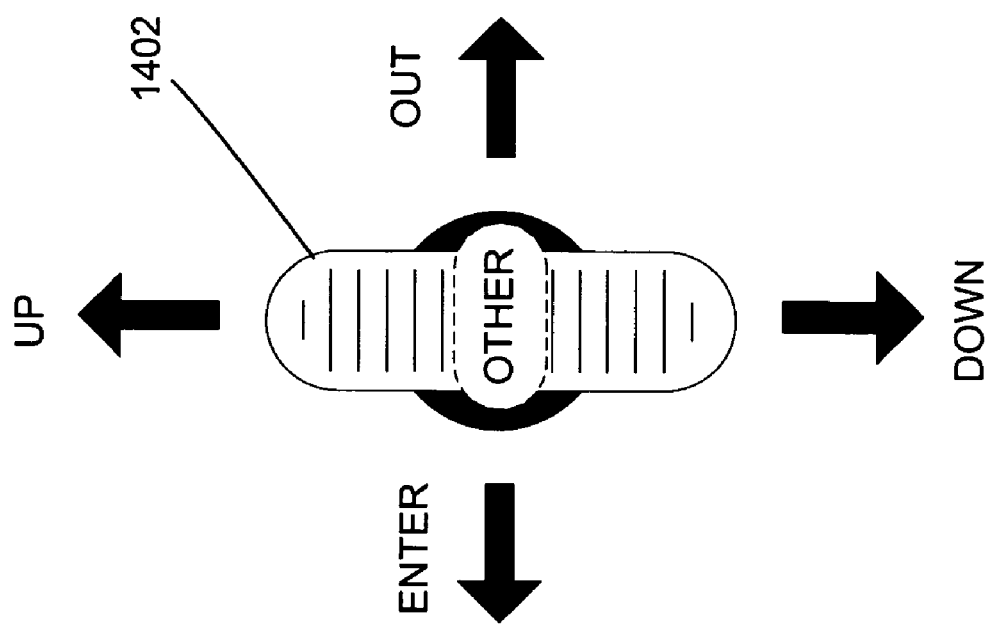
FIG. 14A illustrates one embodiment of the present invention employing a super wheel.
Figure 14B:
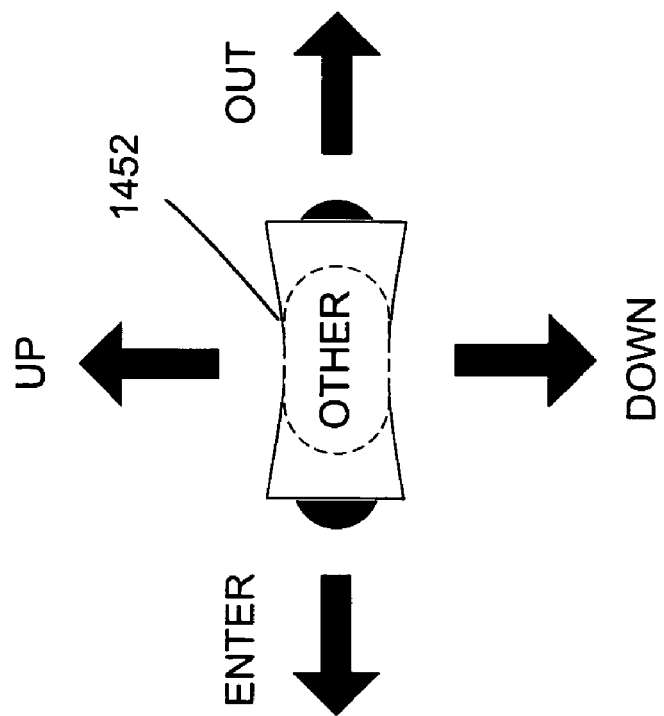
FIG. 14B illustrates one embodiment of the present invention employing a super dogbone.

One way to extend the logical four-command arrangement is to extend the physical four-button arrangement by simply adding more buttons (or button logical equivalents) and mapping additional commands. For example, if the four-button functionality of the rocking wheel illustrated in FIG. 10 further includes the press entry functionality of the clicking wheel in FIG. 9, this enhanced wheel—referred to hereinafter as a super wheel—logically manifests a fifth button and thus can directly employ a fifth command (or be utilized in a logical or in-combination schema as discussed later herein). Likewise, if the four-button functionality of the rocking dogbone illustrated in FIG. 12 further includes the press entry functionality of the clicking wheel in FIG. 13, this enhanced dogbone—referred to hereinafter as a super dogbone—logically manifests a fifth button and thus can directly employ a fifth command (or, again, be utilized in a logical or in-combination schema as discussed later herein). FIG. 14A illustrates one embodiment of the present invention employing a super wheel while FIG. 14B illustrates one embodiment of the present invention employing a super dogbone.

When a super wheel or super dogbone is combined with additional buttons, a powerful navigation device capable of being operated by one hand (or even one finger or thumb) results. For example, in certain embodiments a device might use a rocking dogbone plus two buttons (six logical buttons total) or a rocking dogbone plus four buttons (eight logical buttons total), each with corresponding commands mapped to the logical buttons. Likewise, by substituting a super dogbone for the rocking dogbone in each of these embodiments and you gain a seven-button device and a nine-button device respectively.

FIG. 15A illustrates one such embodiment of a navigation device that utilizes a super dogbone and four additional physical buttons arranged vertically with the super dogbone in the center of the arrangement. Such nine-button devices are hereinafter referred to as niners, while the specific nine-button device illustrated in FIG. 15A shall be referred to as a vertical niner. Referring to FIG. 15A, the vertical niner 1502 comprises a super dogbone 1504 with two buttons 1506 and 1508 above and two buttons 1510 and 1512 below. The direct commands (or logical input) for each button are listed in the table of FIG. 15C. Note that in this embodiment ENTER, UP, DOWN, and OUT have the same functionality as previously disclosed herein, and ENTER corresponds to two logical buttons (which is permitted though not required). Likewise, an alternative embodiment might comprise an eight-button device, such as that illustrated in FIG. 15B, which has similar command mappings but wherein ENTER corresponds to only a single logical button. Also note that PREV and NEXT, corresponding to Tab and Alt-Tab command calls, are implemented instead of Left Arrow and Right Arrow functions since, in the context of navigation, the PREV and NEXT functionality is more useful; nevertheless, in certain circumstances in may be desirable to combine, say, PREV and a Left Arrow command together in a manner similar to the combination of Escape and Back in the OUT command.

Another method for extending the functionality of logical buttons is to provide special functionality when a button is pressed and "held down" for a predetermined period of time. For example, if a user presses and holds down an UP button, it would be logical for certain embodiments of the present invention to interpret that as a different command, for example, a PAGEUP command replicating the PageUp key on a keyboard. Alternatively, the system could also rapidly repeat the UP command automatically, similar to the effect of pressing and holding down the Up Arrow key on a keyboard.

Another method to extend functionality for the button schemas described herein is to distinguish between different kinds of "motion," similar to the way a mouse differentiates between a single click and a double click. For example, when utilizing a wheel or dogbone schema, it would be a logical extension to consider a flick of the wheel up or down (a flick being a large movement within a short time) as a separate logical button. For example, whereas the normal rolling of a dogbone up or down results in an UP or DOWN command respectively, flicking the wheel up or down could net a PAGEUP or PAGEDOWN command respectively, which in turn equate to the Page Up and Page Down keys on a keyboard respectively.

Another powerful means of extending button functionality is to consider the various combinations of buttons that, when pressed simultaneously, could be used to signify a command different from the commands normally associated with the individual buttons. For example, one embodiment of the present invention may comprise four physical navigation buttons, a rocking dogbone, or a rocking wheel as the primary navigation logical button group, perhaps in addition to a modifier button which enables the four logical buttons to have secondary mappings. The modifier button would in many ways be equivalent to the 'Fn' key on many computerized devices such as laptops, Tablet PCs, and so forth. Moreover, the modifier may could also be "double-tapped" to implement an additional command, such as calling a special menu that might be particularly useful for the specific computerized device in which it is implemented—for example, a menu to rotate the display between portrait and landscape orientations on devices where such functionality would be particularly relevant and useful (and which is discussed in greater detail herein below).

The embodiments thus far described are largely based on mapping different logical results based on different physical user interaction within a given context. However, alternative embodiments will also enable a single specific physical interaction to result in different logical results (e.g., step, scroll, or page) in different contexts (e.g., text document, virtual book, or slide show, respectively). For example, using a rocking dogbone, rolling down may equate to stepping down one line in one context, scrolling down a page in another context, and paging down a document in yet another context, with rolling up having corresponding opposite logical results in each such context. Likewise, again using a rocking dogbone, rocking left can jump between panes in one context, skip among links in another context, or enter a lower branch in a tree-type hierarchy in yet another context, with rocking right again having corresponding opposite logical results in each such context. Other embodiments along these lines operating similarly using a rocking wheel, a super dogbone, a super wheel, four buttons configured in a diamond, eight buttons configured equally along a circle like compass points, a joystick, a D-Pad, a touch pad, a touch strip, and so on and so forth without limitation. Other commands, in addition to step, scroll, and page, may include ENTER and OUT (together "access"), as well as any other two-part abstract opposable commands (generally "abstract").

Flexible Orientation

Figure 16B:
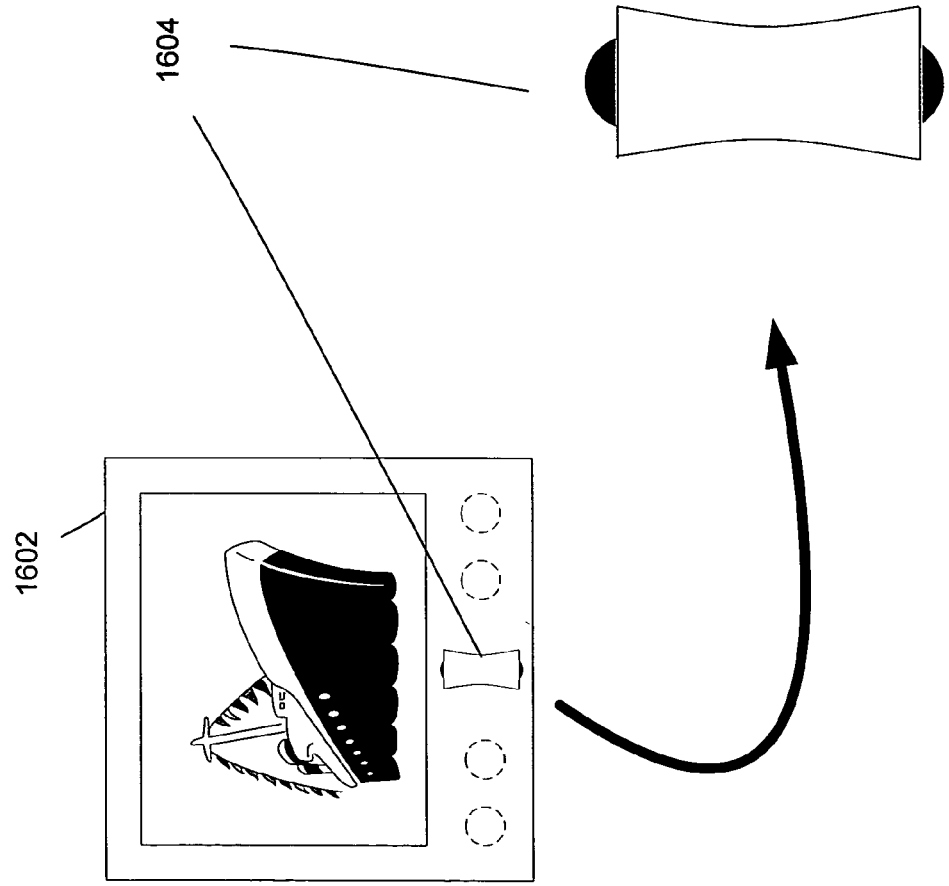
FIG. 16B illustrates the device of FIG. 16A after being rotated ninety degrees (one quarter) to the right to achieve a "bottom landscape" orientation.

On devices where a menu to rotate the display between portrait and landscape orientations would be particularly relevant and useful, another important element of the invention incorporate in various embodiments thereof is the ability to reorient the logical button commands to the physical buttons. For example, consider the device of FIG. 16A illustrating a display device 1602, such as a Tablet PC, in a "right-handed portrait" orientation with a rocking dogbone 1604 attached to the right side thereof. For convenience, the functionality of each logical button for the rocking dogbone 1604, that is, for the rolling up, rolling down, rocking left, and rocking right, are labeled A, B, C, and D respectively (the labels) and remain consistent for the rocking dogbone 1604, whereas the commands for each logical button of the rocking dogbone 1604, labeled U, D, P, N for UP, DOWN, PREV, and NEXT commands respectively, are in fact relative to the rocking dogbone 1604 being in this particular physical orientation (that is, the right-handed portrait orientation) and the logical mapping for logical buttons to commands can be expressed as follows (labels to the left, commands to the right):

A=U
B=D
C=P
D=N

However, for certain embodiments of the present invention, when the display device 1602 is rotated, the logical button assignments are appropriately remapped. For example, consider FIG. 16B which illustrates the device 1602 after being rotated ninety degrees (one quarter) to the right to an "bottom landscape" orientation. This might occur after a user directs the device to change the orientation of the display thus, and the subsequent remapping of the commands to the logical buttons could even occur automatically. In this rotated orientation, the logical mapping for the rocking dogbone 1604 can be expressed as follows (labels to the left, commands to the right):

A=D
B=U
C=P
D=N

Note that while the commands for logical buttons A and B have been transposed (that is, the UP and DOWN commands have been transposed), the commands for the logical button C and D remain the same. The reason for this is that the dogbone 1604 only actually rolls along one axis, here shown initially oriented vertically, and that axis should preferably map to a vertical orientation on the display because vertical display movement is generally more important and more often utilized than horizontal display movement, and thus the capacity of the dogbone 1604 to roll should always be logically mapped to vertical movement, and it is naturally (or at least consistent with other orientations and the manner in which text documents are read) for rolling movement to the right in this case to equate to downward movement on the display. Likewise, remapping the rocking is natural (or at least consistent with other orientations and the manner in which text documents are read) for rocking up in this case to equate to left-ward movement on the display. By remapping (actually, partially remapping) the logical relationship between the logical buttons and the commands they call, a user is able to change the orientation of the device but still be able to utilize the user interface in a manner largely consistent from orientation to orientation.

Figure 16C:
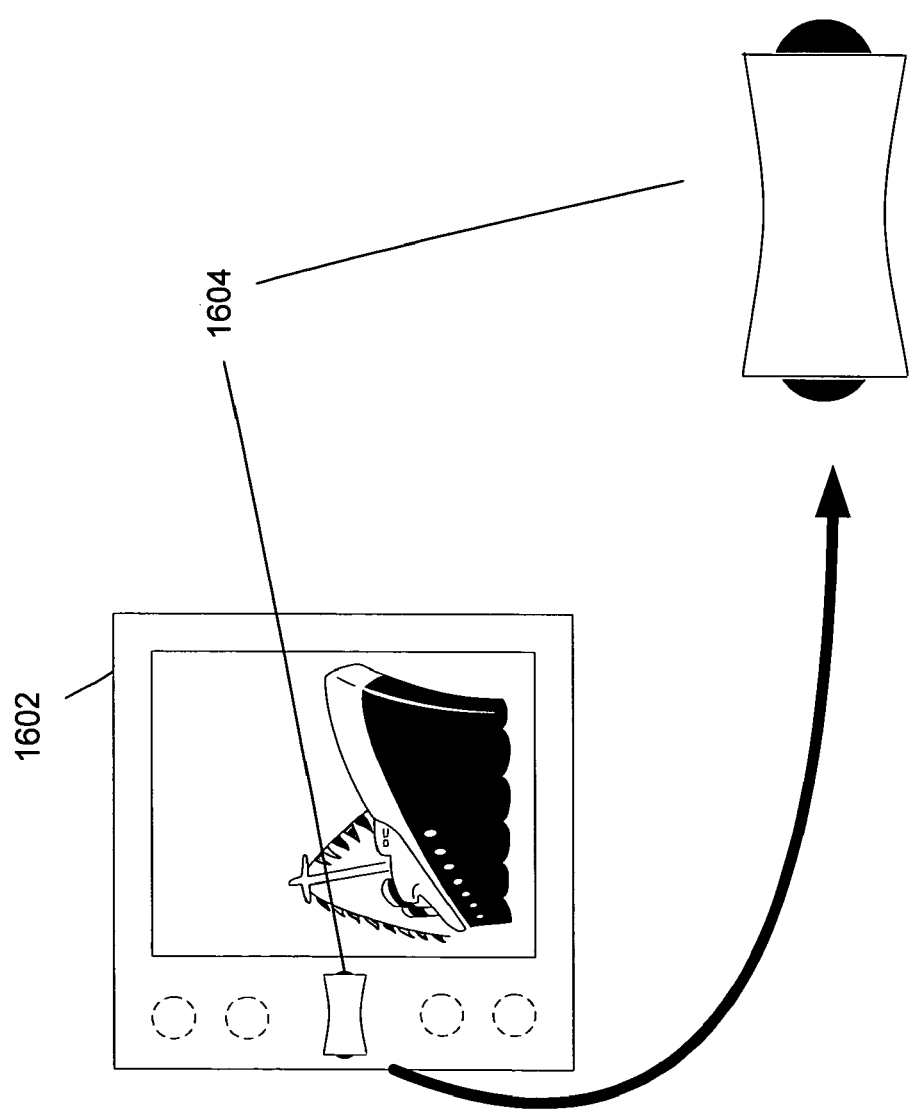
FIG. 16C is an illustration of the device of FIG. 16B rotated another ninety degrees to the right (now 180 degrees total, or one half to the right) forming a "left-handed portrait"

FIG. 16C is an illustration of the same device rotated another ninety degrees to the right (now 180 degrees total, or one half to the right) and the resultant remapping that occurs when the display, automatically or manually, is itself reoriented to be viewed from this device orientation. In this orientation, the logical mapping for the rocking dogbone 1604 can be expressed as follows (labels to the left, commands to the right):

A=D
B=U
C=N
D=P

This orientation, the "left-handed portrait" orientation, is particularly useful for left-hand users. Also note that, when compared to the previous orientation, the commands for logical buttons C and D have now been transposed while that the commands for the logical button A and B remain the same. Also, while this remapping (one hundred eighty degrees) is in fact only a partially remapping from the previous orientation (ninety degrees to the right), it is also a complete remapping from the original orientation.

FIG. 16D is an illustration of the same device rotated yet another ninety degrees to the right (now 270 degrees total, or three-quarters to the right) forming a "top landscape" orientation, and the resultant remapping that occurs when the display, automatically or manually, is itself reoriented to be viewed from this device orientation. In this orientation, the logical mapping for the rocking dogbone 1604 can be expressed as follows (labels to the left, commands to the right):

A=U
B=D
C=N
D=P

Note that, when compared to the previous orientation, the commands for logical buttons A and B have now been transposed while that the commands for the logical button C and D remain the same. If the device were rotated one more time back to the original position, then the commands for logical buttons C and D would be transposed while that the commands for the logical button A and B would remain the same. In summary, certain embodiments of the present invention employ a logical rotation scheme for a fixed navigational device such that the logical buttons correspond to specific commands depending on their orientation, the exact mapping of which is illustrated in the table of FIG. 17. This mapping is best suited for devices that are symmetrical along one physical axis, such as the case with wheels and dogbones.

FIG. 18A illustrates an alternative display device 1802, here a pocket-size display device as an unlimited example, in a "front-end landscape" orientation with a rocking dogbone 1804 integrated at the base of the device, said device then rotated one-quarter to right three subsequent times, and said device remapping the logical commands in a similar fashion to the device of FIGS. 16A-D as shown.

Figure 19A:
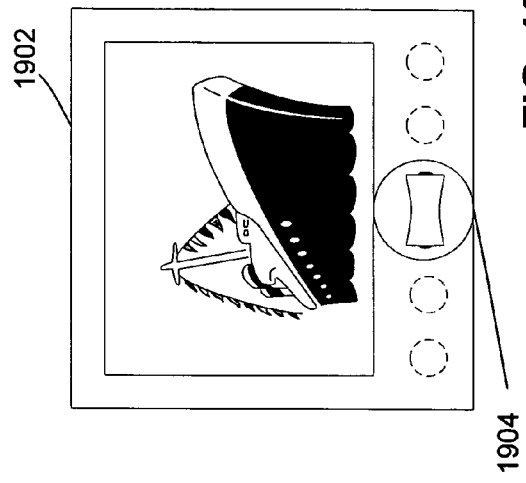
FIG. 19A illustrates a display device having a rotate-able navigation device in a right-handed portrait orientation (original orientation)
Figure 19B:
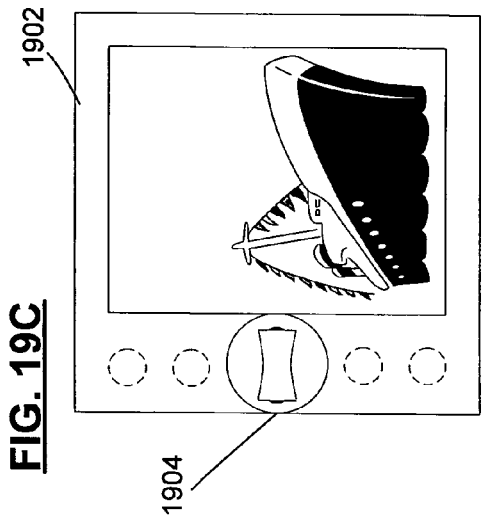
FIG. 19B illustrates the display device of FIG. 19A rotated to the right ninety degrees while the rotate-able navigation device, from the perspective of the display device, is rotated ninety degrees to the left and thus retains the same absolute orientation.
Figure 19D:
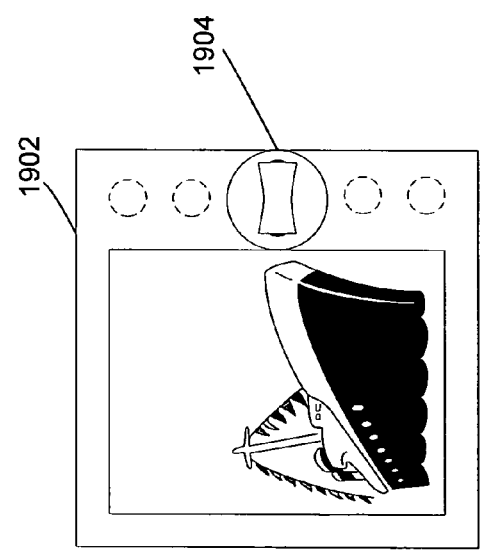
FIG. 19D illustrates the device of FIG. 19D rotated an additional ninety degrees but where the navigation device retains the same absolute orientation.
Figure 19C:
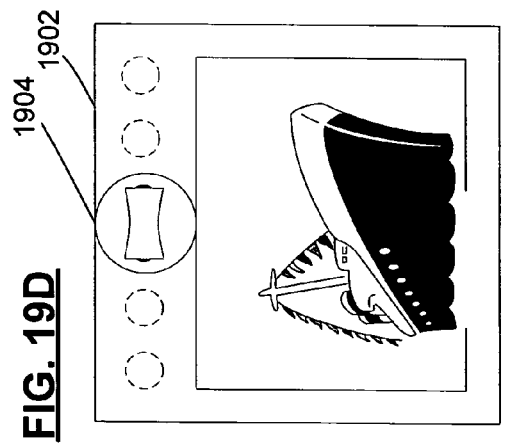
FIG. 19C illustrates the device of FIG. 19B rotated an additional ninety degrees but where the navigation device retains the same absolute orientation.

Another solution to the dilemma of rotating a display device is to also rotate the physical user interface itself. FIG. 19A illustrates a display device 1902 having a rotate-able navigation device 1904, said display device in a in a right-handed portrait orientation. FIG. 19B illustrates the display device 1902 rotated to the right ninety degrees while the rotate-able navigation device 1904, from the perspective of the display device 1902, is rotated ninety degrees to the left and thus retains the same absolute orientation. FIGS. 19C and 19D illustrate the same device rotated an additional ninety degrees each. In each case, the navigation device 1904 retains the same absolute orientation.

In a similar manner, the rotation can also be virtual for certain navigational devices that are physically indistinguishable when rotated, and thus only a logical rotation needs to occur. While this methodology is not suitable for navigational devices utilizing a wheel or dogbone which have a primary rolling axis, other embodiments, such as the four button navigational device illustrated in FIG. 7A where the buttons are arranged in a diamond shape, allow easy direct remapping (a logical rotation) among the physical buttons the achieve functionality in a rotated device similar to that achieved for display devises with a rotate-able navigational devices such as those disclosed in FIGS. 19A-D. This rotation of the commands among the physical buttons is well- suited for any navigation device that symmetrical both vertically and horizontally, such as the case with the diamond shape arrangement previously discussed.

Navigating Unrelated Dimensions

In many of the embodiments described so far, and in particular those embodiments comprising a symmetrical plurality of buttons, the functionality of the logical buttons correspond to the physical location of such buttons—that is, the logical dimensions reflect the physical dimensions. However, alternative embodiments of the present invention break this association between the physical and the logical in order to further extend the functionality of such user interface devices.

Figure 20B:
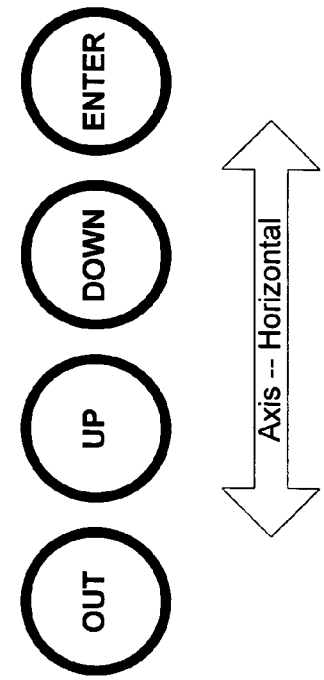
FIG. 20B illustrates four buttons arranged in a straight line.
Figure 20A:
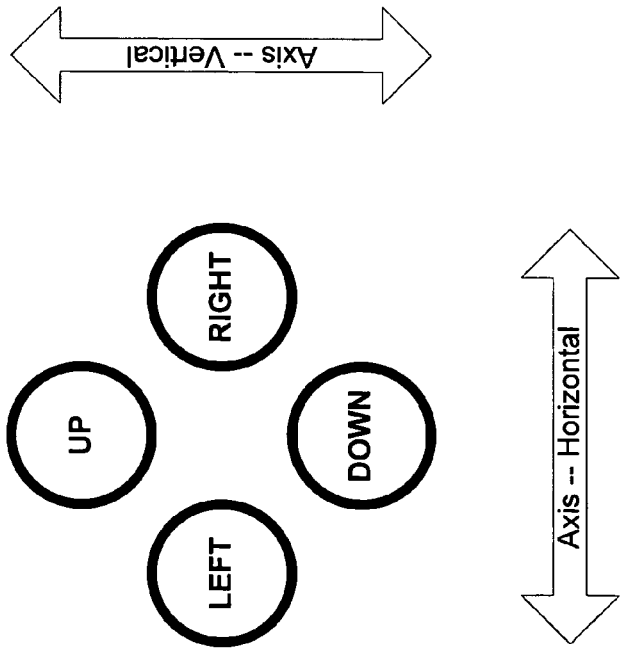
FIG. 20A illustrates a four buttons arranged in diamond configurations.
Figure 20D:
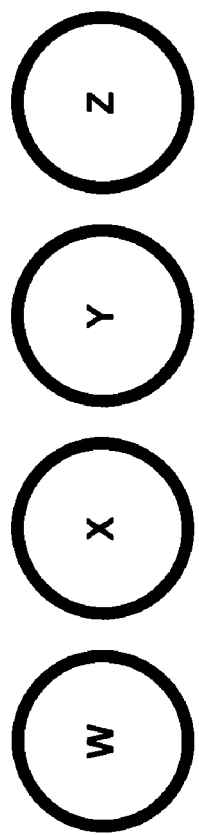
FIG. 20D illustrates the buttons of FIG. 20B without labels.

A symmetrical plurality of buttons is a set of logical buttons (which may or may not comprise all of the logical buttons of the device) and their physical equivalents (e.g., push buttons, wheels, or dogbones) where the latter are physically arranged on the device in a multi-dimensional manner to suggest that the functionality of the buttons are logically interrelated and determinable from the physical layout. For example, consider FIGS. 20A and 20B comprising four buttons arranged in different physical configurations; both of these embodiments have the same buttons, but the buttons of FIG. 20A are arranged multi-dimensionally along two axes (UP and DOWN are arranged vertically while LEFT and RIGHT are arranged horizontally), whereas the buttons of FIG. 20B are arranged uni-dimensionally along a single horizontal axis. The functionality of each button of FIG. 20A, due to the physical layout, is suggested by the interrelationship among the buttons; however, the functionality of the buttons of FIG. 20B are largely indeterminable. For example, in regard to the button layout of FIG. 20C, which is similar to the layout of FIG. 20A but without clear labels, the functionality of each of these buttons can be naturally presumed to be interrelated (A and C are in opposition, and B and D are in opposition, the former relating to a vertical axis while the latter relate to a horizontal axis) and, further, correspond to movement in the relative direction of each button. However, the button layout of FIG. 20D, which is similar to the layout of FIG. 20B but without clear labels, provides no such suggestion of relationship or that the functionality relates to movement in two dimensions (vertical and horizontal).

Figure 20C:
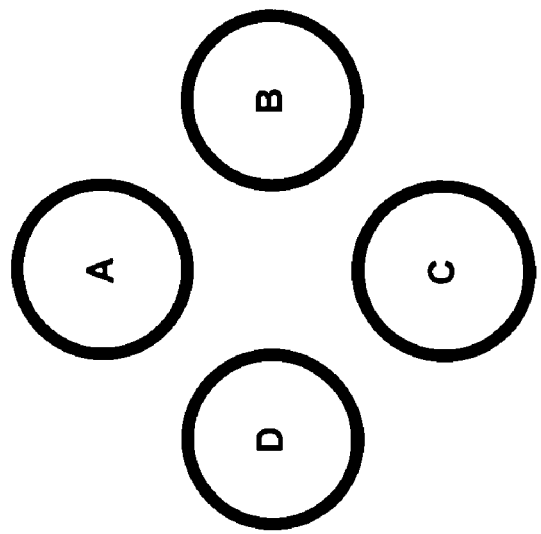
FIG. 20C illustrates the buttons of FIG. 20A without labels.
Figure 21B:
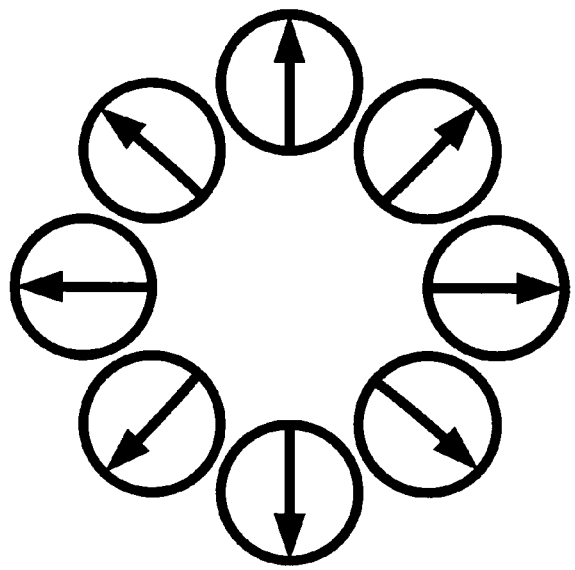
FIG. 21B illustrates the buttons of FIG. 21A with directional labels.
Figure 21C:
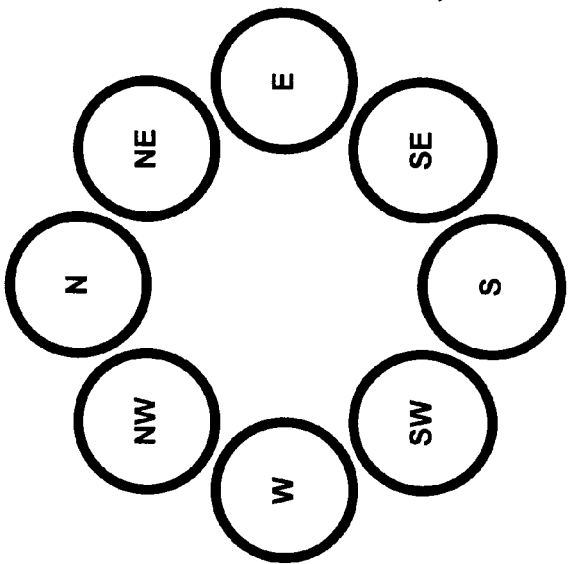
FIG. 21C illustrates the buttons of FIG. 21A with compass labels.
Figure 21A:
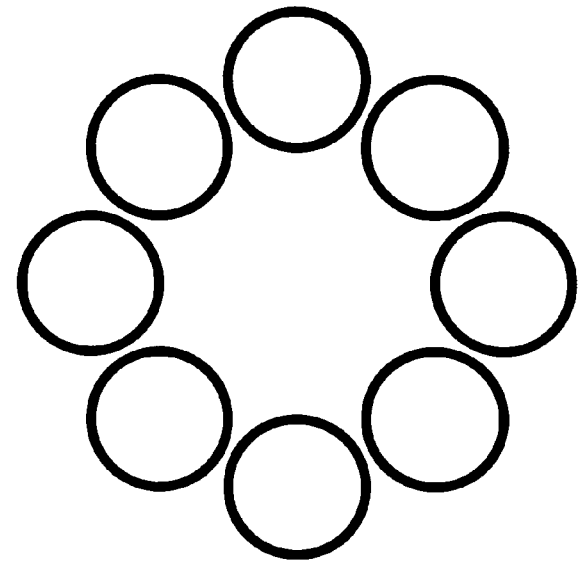
FIG. 21A illustrates eight buttons arranged in a "compass" arrangement in without labels.

Indeed, the four button "diamond" arrangement of FIGS. 20A and 20C and their equivalents (including, for example, rocking wheels and rocking dogbones) so strongly suggest multi-dimensional movement along horizontal and vertical axes that such functionality is often automatically presumed. Furthermore, any such physical relationships between buttons (such as a horizontal and vertical arrangement) are readily presumed to correspond to the underlying functionality of those buttons (such as horizontal and vertical movement) and the prior art is riddled with multi-dimensional being automatically presumed (and limited to) multi-dimensional movement in space (in relationship to X, Y, and axes, and various diagonals thereto). For example, consider the "compass" button arrangement in FIG. 21A that, even without labels, will naturally be presumed to be related to directions along four axes in two-dimensional space as explicitly suggestion by the similar arrangements FIGS. 21B and 21C. However, in many user navigation contexts, such interrelated functionality based solely on physical relationships of the buttons may not be maximally efficient, such as when vertical movement is important but horizontal movement is not, and vice versa.

To maximize versatility and applicability of a single user interface device in various differing contexts, additional embodiments of the present invention comprise a symmetrical plurality of buttons (physically related to each other) corresponding to logical buttons that are asymmetrically (not symmetrically) related (that is, logically unrelated to each other). For example, in one embodiment of the present invention having a four-button multi-dimensional arrangement such as that of FIG. 7A, while the vertical buttons correspond to vertical movement, the horizontal buttons correspond to something other than horizontal movement (in this case, ENTER and OUT). Similarly, another such embodiment of the present invention, where the horizontal buttons correspond to horizontal movement, the vertical buttons correspond to something other than vertical movement. And, of course, in yet another such embodiment, the horizontal buttons correspond to something other than horizontal movement and the vertical buttons correspond to something other than vertical movement. Additional embodiments that employ this method comprise various symmetrical plurality, including without limitation a four-button diamond arrangement, and eight- button compass arrangement, a rocking dogbone (as well as a super dogbone), a rocking wheel (as well as a super wheel), a D-Pad, a joystick, various button arrangements, and/or combinations of any of the foregoing and their equivalents. Moreover, the method is not limited to two-dimension physical or logical embodiments, but is truly multi-dimensional in regard to physical elements as well as logical functionality.

CONCLUSION

The various techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general- purpose processor, the program code combines with the processor to provide a unique apparatus that operates to perform the indexing functionality of the present invention.

While the present invention has been described in connection with the embodiments of the various figures, it is to be understood that other similar embodiments may be used or modifications and additions may be made to the described embodiment for performing the same function of the present invention without deviating there from. For example, while exemplary embodiments of the invention are described in the context of digital devices emulating the functionality of personal computers, one skilled in the art will recognize that the present invention is not limited to such digital devices, as described in the present application may apply to any number of existing or emerging computing devices or environments, such as a gaming console, handheld computer, portable computer, mobile phone, watch, music player, certain mechanical devices, etc. whether wired or wireless, and may be applied to any number of such computing devices connected via a communications network, and interacting across the network. Also for example, the "buttons" (and other physical devices used herein) can be of varying size, shape, spacing, and so forth in order to achieve certain ergonomic advantages. Likewise, each button may be labeled with a word, symbol, or not at all, and each button may have a different color, shape, or other characteristic to distinguish it from the others (or not).

It should be emphasized that a variety of computer platforms, including handheld device operating systems and other application specific operating systems, are herein contemplated, especially as the number of wireless networked devices continues to proliferate. Therefore, the present invention should not be limited to any single embodiment, but rather construed in breadth and scope in accordance with the appended claims.

What is claimed is:

1. A method for cascading commands, said method comprising:
   determining whether a window is at the beginning of its history, and when the window is not at the beginning of its history,
      using an operating system shell hook to issue a first command as an application command to an application following the activation of a logical button, wherein the first command is a keyboard command call Back; and
   when the first command is rejected by the application, automatically issuing at least a second command as an application command to the application using an operating system shell hook, wherein the second command is a keyboard command call Escape; and when the window is at the beginning of its history, then using an operating system shell hook to issue at least the second command as an application command to the application.

2. A computer-readable storage medium having computer-readable instructions for cascading commands, said computer-readable instructions comprising instructions for:

determining whether a window is at the beginning of its history, and when the window is not at the beginning of its history, using an operating system shell hook to issue a first command as an application command to an application following the activation of a logical button, wherein the first command is a keyboard command call Back; and when the first command is rejected by the application, then automatically issuing at least a second command as an application command to the application using an operating system shell hook, wherein the second command is a keyboard command call Escape; and when the window is at the beginning of its history, using an operating system shell hook to issue at least the second command as an application command to the application.

3. A device comprising a memory with instructions stored thereon configured to cascade commands, said instructions implementing the method of:

determining, by a processor, whether a window is at the beginning of its history, and when the window is not at the beginning of its history, the processor using an operating system shell hook to issue a first command as an application command to an application following the activation of a logical button, wherein the first command is a keyboard command call Back; and when the first command is rejected by the application, automatically issuing by the processor at least a second command as an application command to the application using an operating system shell hook, wherein the second command is a keyboard command call Escape; and when the window is at the beginning of its history, the processor using an operating system shell hook to issue at least the second command as an application command to the application.

* * * * *